United States Patent
Shibata

(10) Patent No.: US 10,486,306 B2
(45) Date of Patent: Nov. 26, 2019

(54) CONTROL DEVICE FOR CONTROLLING ROBOT BY LEARNING ACTION OF PERSON, ROBOT SYSTEM, AND PRODUCTION SYSTEM

(71) Applicant: FANUC CORPORATION, Yamanashi (JP)

(72) Inventor: Yukio Shibata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 239 days.

(21) Appl. No.: 15/724,417

(22) Filed: Oct. 4, 2017

(65) Prior Publication Data

US 2018/0099408 A1    Apr. 12, 2018

(30) Foreign Application Priority Data

Oct. 11, 2016   (JP) .................................. 2016-200378

(51) Int. Cl.
G05B 19/04    (2006.01)
G05B 19/18    (2006.01)
B25J 9/16     (2006.01)

(52) U.S. Cl.
CPC ............. *B25J 9/163* (2013.01); *B25J 9/1674* (2013.01); *B25J 9/1697* (2013.01); *G05B 2219/40116* (2013.01); *G05B 2219/40202* (2013.01)

(58) Field of Classification Search
None
See application file for complete search history.

(56) References Cited

FOREIGN PATENT DOCUMENTS

| JP | H6-131274 A | 5/1994 |
|---|---|---|
| JP | H11-175132 A | 7/1999 |
| JP | 2003-80484 A | 3/2003 |
| JP | 2007-283450 A | 11/2007 |
| JP | 2000-263489 A | 9/2008 |
| JP | 2011-051056 A | 3/2011 |
| JP | 2013-151063 A | 8/2013 |
| JP | 2013-180369 A | 9/2013 |
| JP | 2015-230621 A | 12/2015 |
| JP | 2016-159407 A | 9/2016 |

*Primary Examiner* — Bhavesh V Amin
(74) *Attorney, Agent, or Firm* — Hauptman Ham, LLP

(57) ABSTRACT

A control device for a robot for performing an operation in cooperation with a person, the control device includes a machine learning device including a recognition unit for classifying an action of the person, and a learning unit for learning the action of the person, while the person performs an operation in cooperation with the robot; and an action control unit for controlling the action of the robot based on a result of the classification of the recognition unit.

9 Claims, 26 Drawing Sheets

INPUT LAYER    INTERMEDIATE LAYERS (HIDDEN LAYERS)    OUTPUT LAYER

CABLE ACCESS PORT

CABLE

FIG. 8A
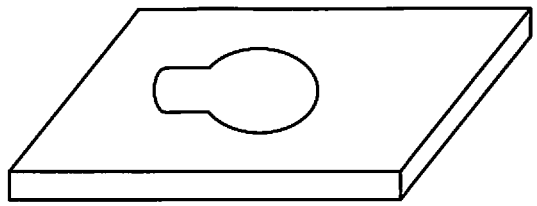
FIG. 8B
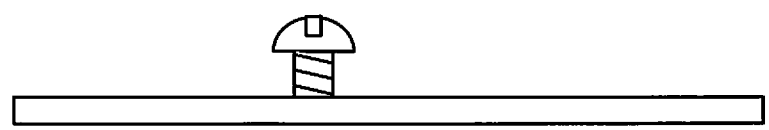
FIG. 8C
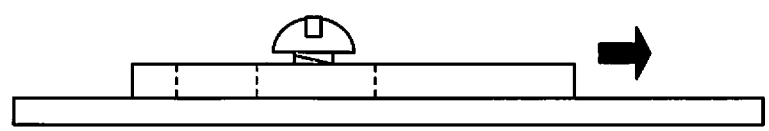
FIG. 8D

FIG. 9A
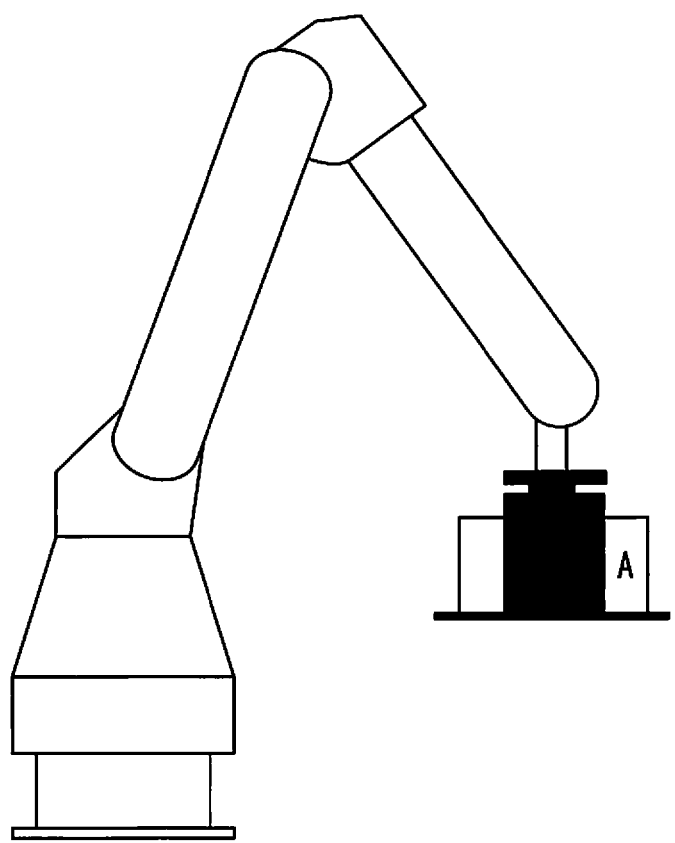
FIG. 9B
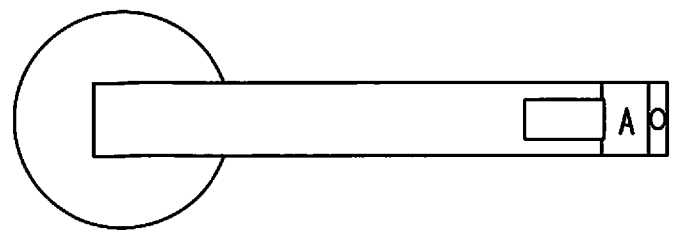
FIG. 9C
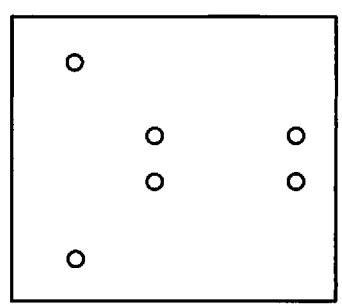
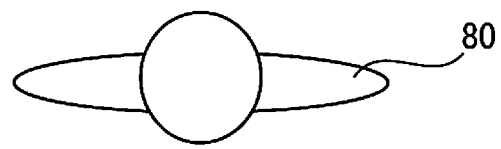

FIG. 16A
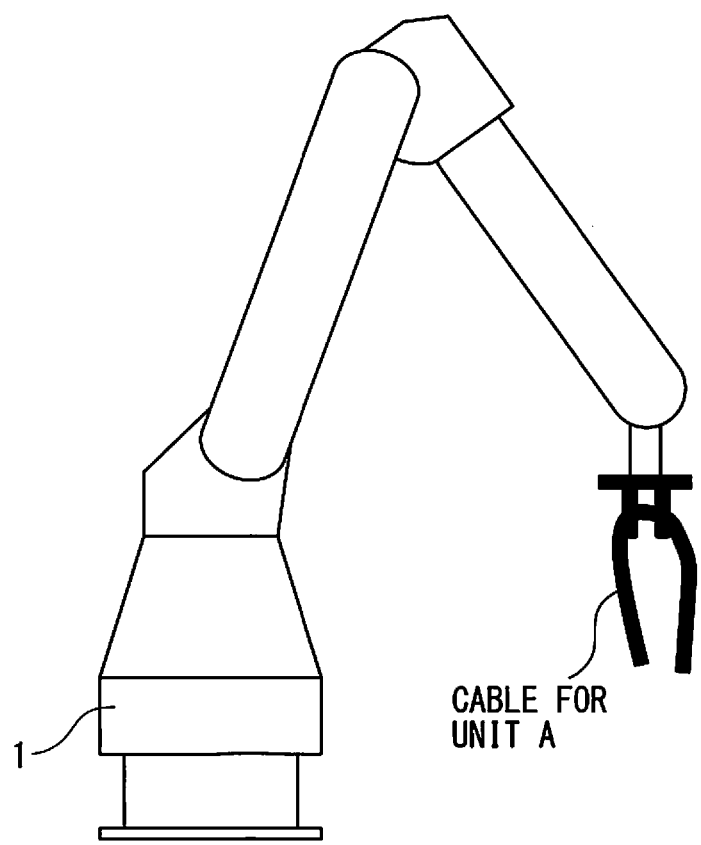
CABLE FOR UNIT A
1
FIG. 16B
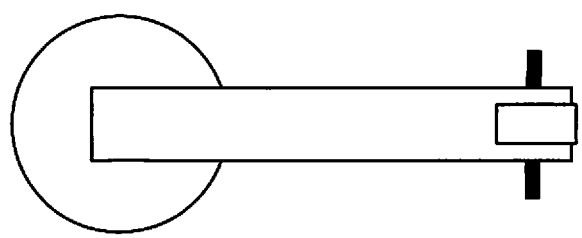
FIG. 16C
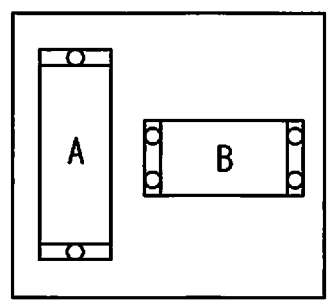
A    B
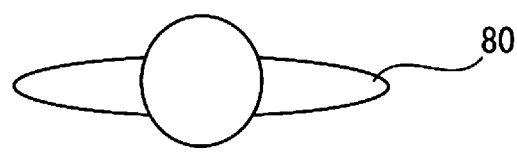
80

FIG. 19
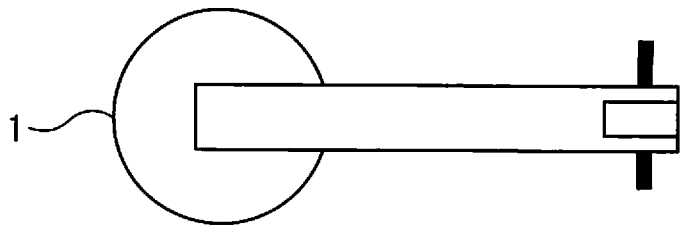
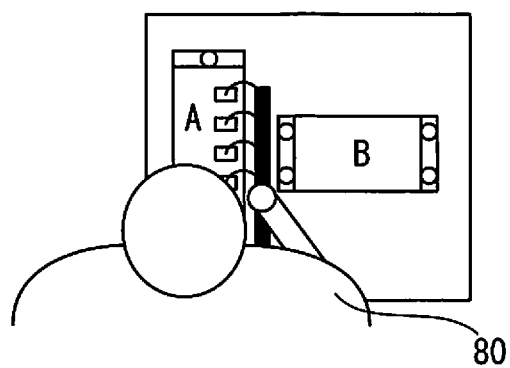
FIG. 20
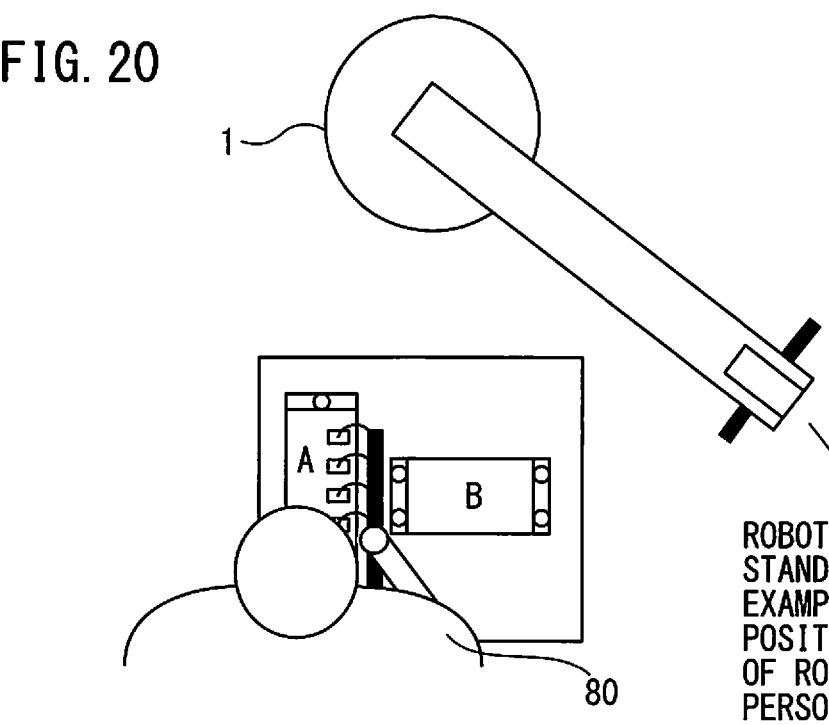
ROBOT ARM NEARBY STANDBY POSITION EXAMPLE (STANDBY POSITION EXAMPLE OF ROBOT 1 WHEN PERSON PERFORMS OPERATION)

FIG. 25
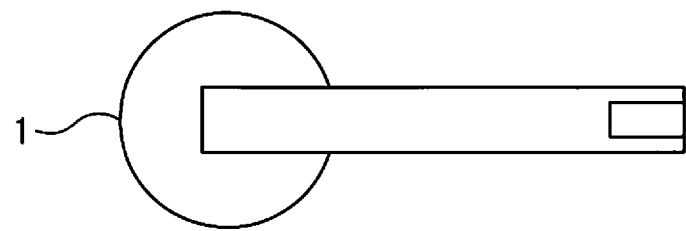
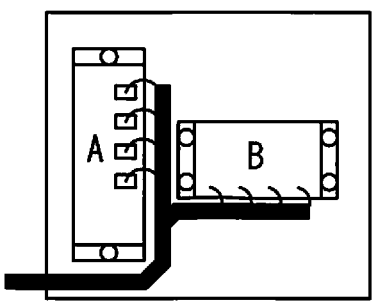
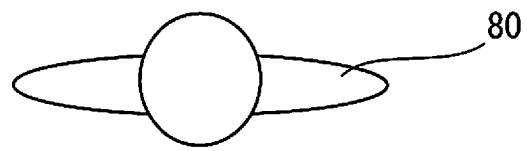
FIG. 26
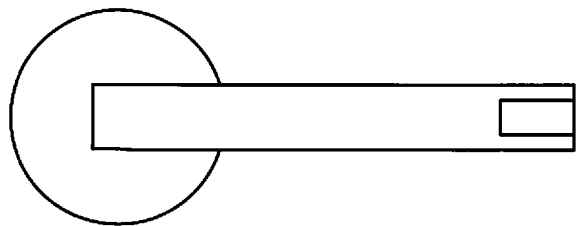
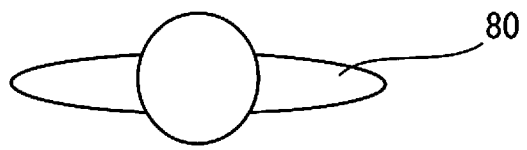

FIG. 27
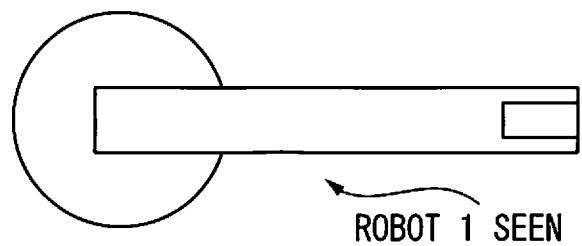
ROBOT 1 SEEN FROM ABOVE
SCREWS OR SCREW HOLES
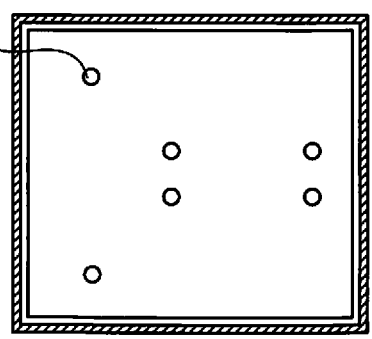
TARGET OBJECT 50 SEEN FROM ABOVE
LIGHT FOR EMPHASIZING FOUR CORNERS OF TARGET OBJECT 50
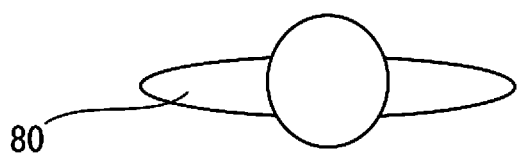
80

TEMPLATE IMAGE

IMAGE FOR EXCTRACTION

EXTRACTION RESULT

IMAGE OF DRIVER

TEMPLATE IMAGE

IMAGE FOR EXTRACTION

DRIVER 9M

80

CONTROL DEVICE FOR CONTROLLING ROBOT BY LEARNING ACTION OF PERSON, ROBOT SYSTEM, AND PRODUCTION SYSTEM

RELATED APPLICATIONS

The present application claims priority to Japanese Patent Application No. 2016-200378 filed Oct. 11, 2016, the disclosure of which is hereby incorporated by reference herein in its entirety.

BACKGROUND OF THE INVENTION

1. Field of the Invention

The present invention relates to a control device for controlling a robot by learning the action of a person, a robot system, and a production system.

2. Description of the Related Art

Conventionally, in robot systems, while a robot operates, in order to enhance the safety of a person, safety measures are taken to prevent the person to enter the working area of the robot. For example, a safety fence is provided around the robot, to prohibit entry of the person to the inside of the safety fence during the operation of the robot.

In recent years, robots (collaborative robots) for performing an operation in cooperation with a person have been researched/developed, and are put into practical use. In such robots (robot systems), a robot and a person (operator) cooperatively perform an operation without, for example, a safety fence around the robot.

Incidentally, for example, Japanese Laid-Open Patent Publication No. 2011-051056 (Patent Document 1) discloses, as a robot (collaborative robot, cooperative operation robot) to coexist with and cooperate with a person, a hanging-type operation robot including: an imaging means; at least one operation arm having a joint for driving a movable part in which reverse input is possible; a body for supporting the operation arm; a supporting member having a base part detachably secured to the ceiling or a wall of the work area so as to hang therefrom and having a tip end for supporting the body and the imaging means; a motion control means which recognizes, based on an image captured by the imaging means, a relative position between a target object and the operation robot in the work area, to cause, based on the relative position, the operation arm to perform an operation for the target object; and an output control means which reducers, when recognizing that the operation is an operation requiring coexistence or cooperation with a person, the output of a motor for moving the joint of the operation arm.

The object achieved by the technology disclosed in Patent Document 1 is to enable, when a collaborative robot (robot) is placed in the work area, the robot to be disposed even when there is an obstacle on the floor in the vicinity of the work area, and to enhance the safety of an operator when the robot is disposed. The object does not require high-accuracy positioning or a great change of an operation command.

In other words, the aforementioned conventional technology may dispose the robot in the vicinity of the operator (person), but is difficult to apply to, for example, an operation including a plurality of processes, in which a robot and a person cooperatively and alternately access target objects placed on the table, to assemble the target objects. In other words, the conventional technology does not control the action of the robot based on results of the recognition of the action of the person.

In view of these problems, the object of the present invention is to provide a control device, which learns the action of the person using a machine learning device that learns the action of the person by recognizing the action of the person, to control the robot, a robot system, and a production system.

SUMMARY OF INVENTION

According to a first example of a first aspect of the present invention, there is provided a control device for a robot for performing an operation in cooperation with a person, the control device including a machine learning device including a recognition unit for classifying an action of the person, and a learning unit for learning the action of the person, while the person performs an operation in cooperation with the robot; and an action control unit for controlling the action of the robot based on a result of the classification of the recognition unit.

According to a second example of a first aspect of the present invention, there is provided a control device for a robot for performing an operation in cooperation with a person, the control device including a machine learning device including a recognition unit which recognizes a face of the person to classify an action of the person based on a weight in a neural network corresponding to the person, and a learning unit for learning the action of the person, while the person performs an operation in cooperation with the robot; and an action control unit for controlling the action of the robot based on a result of the classification of the recognition unit.

The recognition unit may receive, as state variable, data based on an image input, and generate an output obtained by classifying the action of the person, and the learning unit may include an error calculation unit that receives the output obtained by classifying the action of the person, which is generated by the recognition unit, and calculates an error based on teacher data which have been input; and an error model update unit that updates, based on an output of the error calculation unit, an error model for controlling an action of the robot by the action of the person.

According to a third example of a first aspect of the present invention, there is provided a control device for a robot for performing an operation in cooperation with a person, the control device including a machine learning device which includes a recognition unit that classifies an action of the person based on a weight read out from a neural network by communicating with a higher-level controller and the learning unit that learns the action of the person; and an action control unit which controls an action of the robot based on a result of the classification of the recognition unit.

According to a fourth example of a first aspect of the present invention, there is provided a control device for a robot for performing an operation in cooperation with a person, the control device including a recognition unit for determining whether the person enters a working area or a movable area of the robot while the person performs an operation in cooperation with the robot; and an action control unit which restricts or stops an action of the robot based on a result of the determination of the recognition unit, to control the standby or restart of the action of the robot performing an operation in cooperation with the person.

The robot may be an industrial robot, a field robot, or a service robot. The recognition unit may use at least one of a neural network and template matching. The control device may further include a plurality of cameras for photographing, wherein the recognition unit may recognize an action of the person based on an image photographed by each camera, and use an output of the recognition unit as an input of an AND circuit, and an output of the AND circuit as an output of the recognition unit. The control device may transmit, after the person acts in cooperation with the robot, operation information and learning information to a higher-level controller.

The operation information may include at least one of an item name, a process, a person specified by image recognition, the type of the robot, and the operation time of the person and the robot, and the operation time may include at least one of a time from the start to the end of an operation, and a motion time and a downtime of the person and the robot at every operation. The learning information may be a weight in the neural network.

According to a second aspect of the present invention, there is provided a robot system including a plurality of control devices according to the above described first aspect, wherein the plurality of control devices are connected to one another via a communication line, and the control devices each learn an action of a person separately, and transmit the learned information via the communication line, to share the same.

According to a first example of a third aspect of the present invention, there is provided a production system including a cell including a plurality of robots and a plurality of control devices for controlling the plurality of robots; a cell controller communicably connected to the control devices included in the cell; and a management controller communicably connected to the cell controller, wherein the cell controller acquires operation information and learning information, which are transmitted from the control devices included in the cell; transmits the operation information and the learning information to the management controller; and obtains a difference between the operation time of the operation information and an operation time for comparison, and transmits, if the difference is larger than an optional set value, at least one of a delay of an operation, a standard operation method, and an operation time for comparison as an appropriate operation time to the control device which has transmitted the operation information, and is displayed on a display of the control device.

According to a second example of a third aspect of the present invention, there is provided a production system including a cell including a plurality of robots and a plurality of control devices for controlling the plurality of robots; a cell controller communicably connected to the control devices included in the cell; and a management controller communicably connected to the cell controller, wherein the management controller acquires operation information and learning information, which have been transmitted from the cell controller, stores the operation information and the learning information, and decides a weight for a specified item/specified process. The decided weight may be a weight for one person, a weight for one person which is selected from weights for a plurality of persons, or a weight obtained by combining weights for a plurality of persons.

BRIEF DESCRIPTION OF THE DRAWINGS

The present invention will be clearly understood with reference to the appended drawings below.

FIG. 8A, FIG. 8B, FIG. 8C and FIG. 8D are explanatory views of an example in which a screw in a target object is engaged in a hole of a unit;

FIG. 9A, FIG. 9B and FIG. 9C are, as in FIG. 7A, FIG. 7B and FIG. 7C, views showing a target object having no units and cables are placed at predetermined positions;

FIG. 16A, FIG. 16B and FIG. 16C are views showing the state in which a unit is mounted on the target object in FIG. 7A, FIG. 7B and FIG. 7C and FIG. 9A, FIG. 9B and FIG. 9C;

FIG. 19 is a (third) view for explaining an example of treatment for the target object shown in FIG. 16A to FIG. 16C;

FIG. 20 is a (fourth) view for explaining an example of treatment for the target object shown in FIG. 16A to FIG. 16C;

FIG. 25 is a (ninth) view for explaining an example of treatment for the target object shown in FIG. 16A to FIG. 16C;

FIG. 26 is a view for explaining an example in which the target object is discharged;

FIG. 27 is a view for explaining an example of a configuration for confirming that a part of the body does not enter the inside of an enclosure of the target object;

DETAILED DESCRIPTION

Embodiments of a control device, a robot system, and a production system according to the present invention will be described below in detail with reference to the accompanying drawings. Note that, in the following figures, a person, a robot, etc. are properly modified in scale to assist the understanding thereof. Here, the robot system is defined as a system in which a person and a robot cooperate with each other, to perform a predetermined operation. In the following descriptions, an operation, in which a person and a robot cooperate with each other to assemble a unit and a cable with a target object, will be explained as an example. However, of course, the application of the present invention is not limited to this operation.

Figure 1:
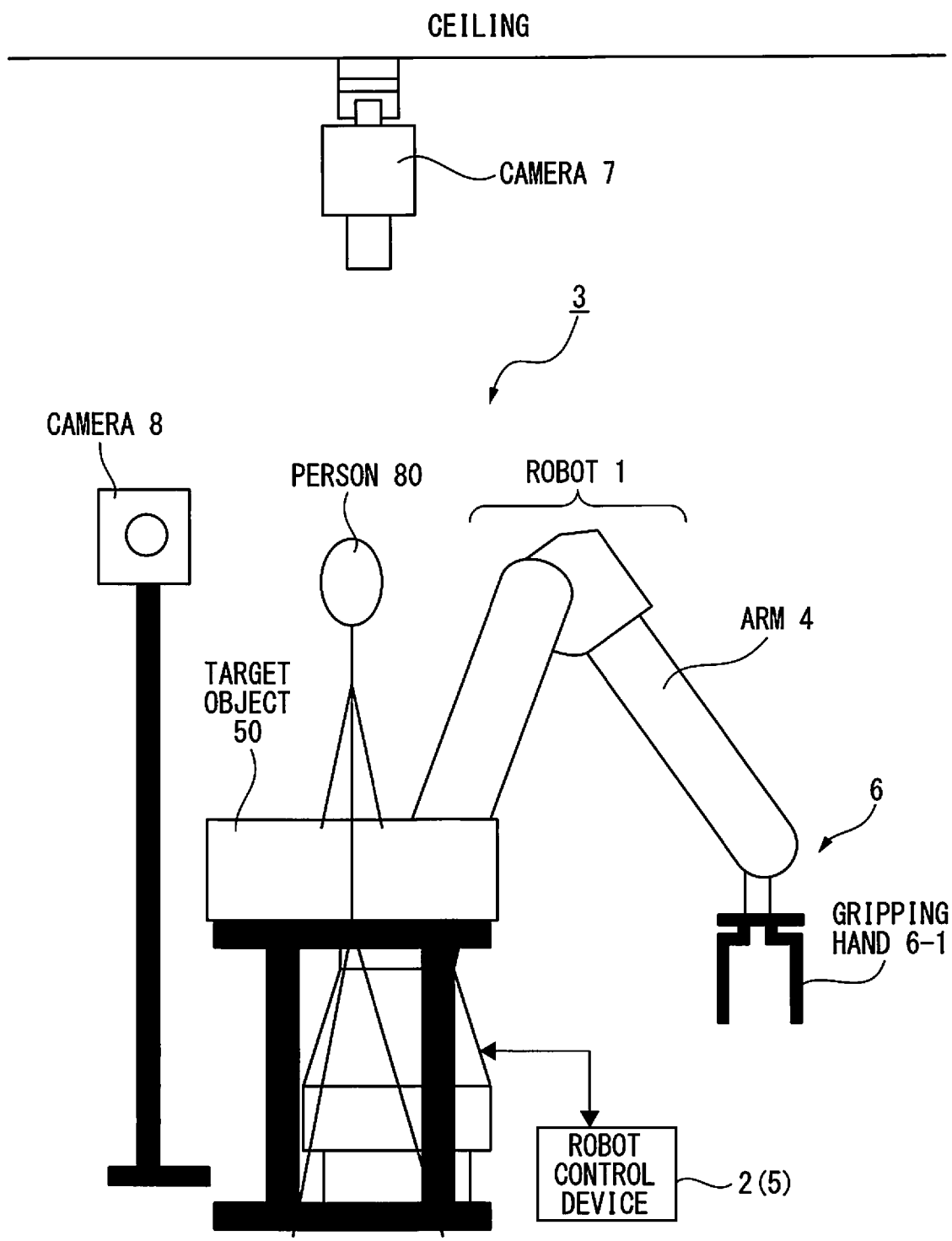
FIG. 1 is a schematic view of a configuration example to which an example of a robot system according to this embodiment is applied.
Figure 2:
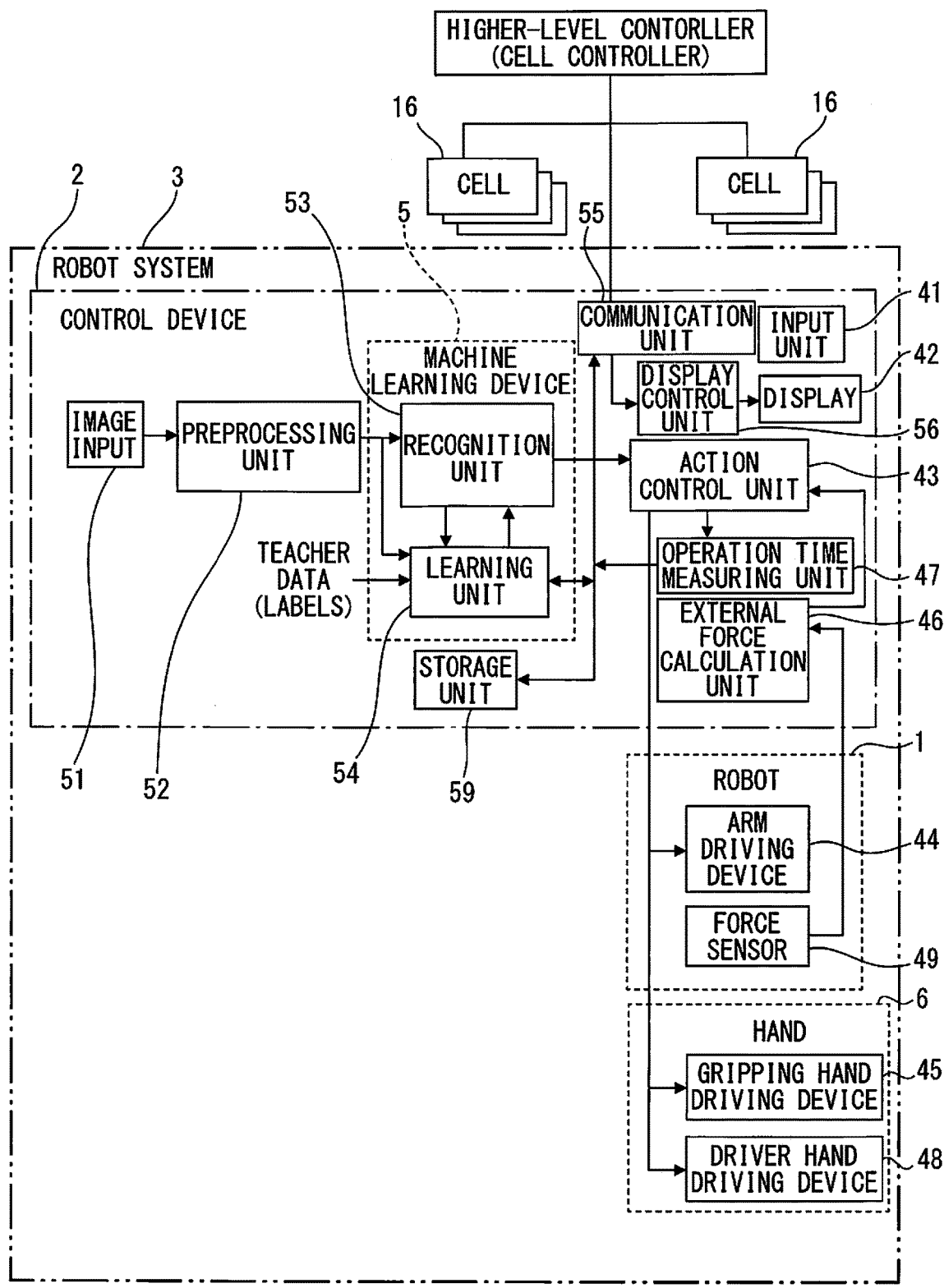
FIG. 2 is a block diagram of an example of the robot system in FIG. 1.

FIG. 1 is a schematic view of a configuration example to which an example of a robot system according to this embodiment is applied. FIG. 2 is a block diagram of an example of the robot system in FIG. 1. First, with reference to FIG. 1 and FIG. 2, an example of the robot system according to this embodiment will be described. A robot (collaborative robot) 1 of this embodiment is an articulated robot including an arm 4 and a plurality of pivot/rotation axes. Note that, in the following descriptions, an embodiment, in which the articulated robot is used, will be described as an example. However, of course, the application of the present invention is not limited to the articulated robot.

A robot system 3 includes a hand 6 as an end effector attached to the robot 1. A gripping hand 6-1 has a function for gripping and releasing a unit or cable. As in, for example, FIG. 12 that will be described later, the robot system 3 includes a driver hand 6-2 as an end effector by replacing the gripping hand 6-1 with the driver hand 6-2, and then has a function for fastening screws using a driver. Further, although not illustrated in the figures, the gripping hand 6-1 may be replaced with the driver hand 6-2 by, for example, a hand changer. Note that the hand changer is a well-known technology, and accordingly, the detailed description thereof is omitted. The end effector is not limited to the gripping hand or the driver hand, and the type of the end effector may be selected in accordance with the contents of work.

As shown in FIG. 2, the robot 1 includes an arm driving device 44 for driving pivot/rotation axes. The arm driving device 44 includes arm driving motors disposed within the corresponding pivot/rotation axes. Driving the arm driving motors causes the arm 4 to pivot/rotate so as to be positioned at a desired angle. Note that the robot 1 is not limited to an industrial robot, and may be applied to a field robot or a service robot.

The robot 1 has a gripping hand driving device 45 for closing and opening the hand 6-1. When the gripping hand is replaced with the driver hand by the hand changer, the robot 1 has a driver hand driving device 48 for fastening screws using the driver of the hand 6-2. The gripping hand driving device 45 has a gripping hand driving cylinder for driving the hand 6-1, and an air pump and an electromagnetic valve, which supply compressed air to the gripping hand driving cylinder.

The driver hand driving device 48 includes an air pump for supplying compressed air, and an electromagnetic valve, to drive the driver of the hand 6-2. Note that the hand may be electrically opened and closed or the driver may be electrically rotated, without using compressed air. If the replacement of the hand may cause an accuracy problem, it is necessary to use a plurality of robots, or to change the hand in design. Here, suppose that the replacement of the hand does not cause an accuracy problem. Further, to avoid confusion in the drawings, a hand driving device is not illustrated in FIG. 1.

When units and cables in a target object 50 are assembled, a change in force is detected by, for example, a force sensor 49. The force sensor 49 may be provided at any location, but is herein provided at a wrist part for easy understanding. Note that any detector, which may detect a force applied to the robot 1, may be adopted as the force sensor 49.

The robot 1 is driven based on an action command of a control device 2 (action control unit 43). The control device 2 includes an arithmetic processing unit having a CPU (Central Processing Unit), a RAM (Random Access Memory), a ROM (Read Only Memory), etc., which are interconnected via a bus line. The control device 2 includes a storage unit 59 for storing various pieces of information. The control device 2 includes an action control unit 43 for controlling the arm driving device 44, the gripping hand driving device 45, and the driver hand driving device 48. The action command from the action control unit 43 drives the arm driving device 44, the gripping hand driving device 45, and the driver hand driving device 48. The control device 2 of this embodiment includes an external force calculation unit 46 for estimating an external force to be applied to the robot 1 from the outside of the robot 1.

As shown in FIG. 2, the control device 2 includes an input unit 41 and a display 42. The display 42 is formed so as to display, for example, information regarding driving of the robot 1. Examples of the display 42 include a liquid crystal display device. The input unit 41 is formed so that a person may input a desired command to the control device 2. Examples of the input unit 41 include a keyboard. Note that the target object 50 in FIG. 1 rides on, for example, a platform (which may be a wheeled platform although wheels are not shown, or which may be a belt conveyer), and is placed so that its mounting surface faces toward the ceiling. Further, a person (operator) 80 stands upright without working. A camera 7 is attached to the ceiling, and the angle and scale thereof may be changed. The camera 7 is adapted to capture images of the target object 50, the person 80, and the robot 1. It is preferable that a camera 8 is placed at a position for photographing the front of the person 80.

With reference to FIG. 2, the explanation will continue. The control device 2 in this embodiment includes a machine learning device 5 which learns the action of the person 80, and learns the motion of the person 80 so that the robot 1 appropriately operates for the action of the person 80. In the machine learning device 5 of this embodiment, a recognition unit 53 recognizes (classifies) the action of the person 80 from an image input 51 (an image of the camera 7 or the camera 8), and a learning unit 54 performs learning activities. In the learning activities, weights are found out in a neural network that will be described later. When the learning unit 54 updates the weights in the neural network, the recognition unit 53 obtains the updated weights from the learning unit 54. After the recognition unit 53 obtains the updated weights, the updated weights are used for calculation of the neural network. When it is determined that the action of the person 80 is a predetermined action, the action control unit 43 controls the robot 1 so that the robot 1 operates in accordance with the determination. A preprocessing unit 52 preprocesses (for example, dimensionally compresses) the image so that, for example, the recognition unit 53 may operates at a high speed. Regarding the preprocessing for the image, various known methods may be adopted, and accordingly, the explanation thereof is omitted.

In the recognition unit 53 and the learning unit 54, the recognition unit 53 authenticates the face of the person 80 when, for example, the power source is turned on, and the weights stored in the storage unit 59 are used, or the weight corresponding to the person 80 is obtained from a higher-level controller, and is used. Note that, in place of the face authentication performed by the recognition unit 53, the person 80 may be determined by inserting a storage medium, for example, a USB (Universal Serial Bus) memory that stores the information of the person 80 to a USB port.

Alternatively, the person 80 may be determined by, for example, an ID or an ID+a password from the keyboard, or an ID card+a reader. As a result of the determination, the weights stored in the storage unit 59 may be used, or the weight may be obtained from the higher-level controller and used. Note that the weight for one person selected among a plurality of persons or the weight obtained by combining the weights of a plurality of persons may be transmitted from the higher-level controller and used. Further, the weights in the learning unit 54 are updated, the storage unit 59 stores learning information (the weights in the neural network). Suppose that one weight (the weight for one person) that is at least usable is previously stored.

Alternatively, as shown in FIG. 2, machine learning devices 5 of a plurality of control devices 2 may be configured to share or exchange data via communication media. In, for example, a machine factory including a plurality of robot systems 3 controlled by the corresponding control devices 2, i.e., a production system including a plurality of robot systems 3, the machine learning devices 5 of the corresponding robot systems 3 are adapted to share or exchange data via a communication medium, e.g., a communication line, such as Ethernet (registered trademark) or the Internet. Note that the learning unit 54 of each machine learning device 5 may be provided in the higher-level controller without being, for example, provided in the corresponding one of the control devices 2. As seen above, sharing or exchanging the learned information enables the number of learning activities to increase. Consequently, the accuracy in learning may be improved.

The control device 2 includes an operation time measuring unit 47 for measuring an operation time. The operation time measuring unit 47 of this embodiment measures a time from the start to the end of assembling, and a motion time and a downtime (outage time) of the person 80 and the robot 1 at every operation. The operation time measuring unit 47 of this embodiment measures an operation time based on a command of the action control unit 43. Note that, in this specification, the person 80 is defined as a person who performs an operation (treatment) in cooperation with the robot 1, and, when only the word "person" is described without a reference numeral, the definition of the "person" includes not only a person who actually perform a treatment (operation) in cooperation with the robot 1 but also a person who does not directly cooperate with the robot 1.

The machine learning device will now be described. The machine learning device has functions of analytically extracting, from a set of data as inputted into the device, a useful rule, a knowledge representation, a criterion for determination or the like contained therein, outputting a result of the determination, and performing knowledge learning (machine learning).

Various techniques are available for the machine learning, which are broadly classified into, for example, "supervised learning", "unsupervised learning", and "reinforcement learning". In addition, there is a technique referred to as "deep learning" in which extraction of a feature value per se is learned in order to implement these techniques.

Note that a "(supervised) neural network" is applied to each machine learning device 5 shown in FIG. 2.

Although the machine learning device (machine learning device 5) may use a general-purpose computer or a processor, adoption of, for example, general-purpose computing on graphics processing units (GPGPU), large-scale PC clusters or the like allows higher processing.

First, "supervised learning" is a method in which a large volume of input-output (label) paired data are given to a machine learning device, so that characteristics of these datasets may be learned, and a model (error model) for inferring an output value from input data, i.e., the input-output relation may be inductively acquired. This may be achieved using an algorithm, for example, a neural network that will be described later.

"Unsupervised learning" is a method in which a large volume of input-only data are given to a machine learning device, so that the distribution of the input data may be learned, and a device for, for example, compressing, classifying, and fairing the input data may be learned even if the corresponding teacher output data are not given. For example, characteristics of these datasets may be clustered based on their similarity. The result obtained from the learning is used to set a certain criterion, and then, the allocation of output is performed so as to optimize the criterion, so that the prediction of output may be achieved.

There is another problem setting method situated between "unsupervised learning" and "supervised learning", which is known as "semi-supervised learning". In this learning method, a small volume of input-output paired data and a large volume of input-only data are provided. In this embodiment, data (e.g., image data or simulation data), which may be acquired even when the person 80 and the robot system 3 are not actually operated, are used in unsupervised learning, to efficiently perform learning.

The reinforcement learning will now be described. Problems are set in reinforcement learning as follows.

A processing machine observes the state of environment, and decides an action.

The environment varies in accordance with some rules, and your action may vary the environment.

A reward signal is returned at each action.

The target of maximization is the sum of (discount) rewards to be obtained now and in the future.

Learning starts from the state in which a result caused by an action is completely unknown, or is incompletely known. The processing machine may acquire the result as data only after it actually starts operating. In other words, it is necessary to search the optimal action through trial and error.

It is also possible to set, as an initial state, the state, in which a prior learning (e.g., the above supervised learning, or inverse reinforcement learning) is performed so as to emulate the action of a person, and start learning from an appropriate starting point.

"Reinforcement learning" is a learning method for learning not only determinations or classifications but also actions, to learn an appropriate action based on the interaction of an action to environment, i.e., to learn a method to maximize rewards to be obtained in the future. The explanation of reinforcement learning will be continued below using, for example, Q-learning, but reinforcement learning is not limited to Q-learning.

Q-learning is a method for learning a value Q(s, a) at which an action a is selected under an environmental state s. In other words, it is only required that the action a having the highest value Q(s, a) is selected as an optimal action a, under a given state s. However, initially, the correct value of the value Q(s, a) for a combination of the state s and the action a is completely unknown. Then, the agent (the subject of an action) selects various actions a under a given state s, and gives rewards to the actions a at that time. Thus, the agent learns selection of a more beneficial action, i.e., the correct value Q(s, a).

As a result of the action, the sum of rewards to be obtained in the future is represented by $Q(s, a)=E[\Sigma\gamma^t r_t]$, where $E[\Sigma\gamma^t r_t]$ represents an expected value. The maximization of the value Q(s, a) is desired, but is finally achieved when the state varies in accordance with the optimal action. As a matter of course, the expected value is unknown, and accordingly, should be learned while being searched. The update expression for such a value Q(s, a) is given, for example, by equation (1) as follows:

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In the above equation (1), $s_t$ represents a state of the environment at a time t, and $a_t$ represents an action at the time t. Upon the action $a_t$, the state changes to $s_{t+1}$. $r_{t+1}$ is the reward to be received upon a change in the state. The term, to which "max" is appended, is obtained by multiplying the Q-value, which is obtained when the action a having the highest Q-value at that time is selected under the state $s_{t+1}$, by γ. γ is the parameter having a range of 0<γ≤1 (when γ=1 is satisfied, the range of the cumulative sum does not reach an infinite value, and is limited), and is called discount rate. α is the learning factor, and has a range of 0<α≤1.

The equation (1) represents a method for updating the evaluation value $Q(s_t, at)$ of the action $a_t$ in the state $s_t$ based on the reward $r_{t+1}$ returned as a result of the trial $a_t$. More specifically, when the sum of the sum of the reward $r_{t+1}$ and the evaluation value $Q(s_{t+1}, \max a_{t+1})$ of the best action max a in the state subsequent to the state s upon the action a is greater than the evaluation value $Q(s_t, a_t)$ of the action a in the state s, $Q(s_t, a_t)$ is increased; otherwise, $Q(s_t, a_t)$ is reduced.

In other words, the value of a particular action in a particular state is brought close to the reward immediately returned as a result, and the value of the best action in the subsequent state upon the particular action.

Examples of the method for expressing Q(s, a) on a computer include a method for preserving the values of all state action pairs (s, a) as a table, and a method for preparing a function to approximate Q(s, a). In the latter method, the above update expression may be achieved by adjusting a parameter of the approximate function using a method, such as stochastic gradient descent. A neural network may be used as the approximate function.

Figure 3:
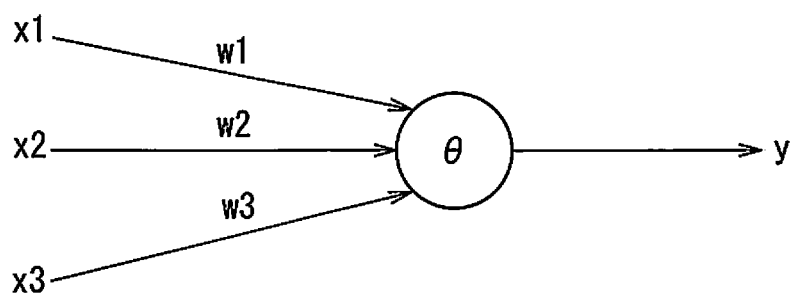
FIG. 3 is a diagram schematically showing a neuron model.
Figure 4A:
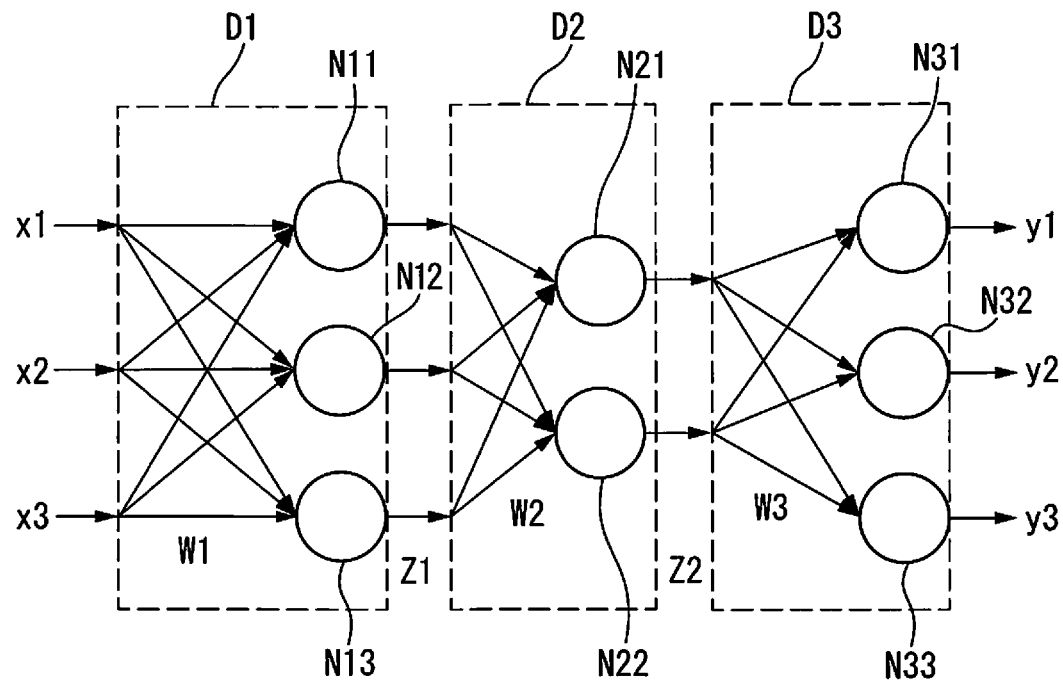
FIG. 4A and FIG. 4B are diagrams schematically showing a neural network having three calculation layers configured by combining neurons shown in FIG. 3.

The neural network will now be described. FIG. 3 is a diagram schematically showing of a neuron model. FIG. 4A is a diagram schematically showing a neural network having three calculation layers configured by combining the neurons shown in FIG. 3. Specifically, the neural network includes, for example, an arithmetic device and a memory, which realize a neural network simulating a neuron model as shown in FIG. 3.

As shown in FIG. 3, a neuron outputs an output (result) y in response to a plurality of inputs x (inputs x1 to x3 are provided as an example in FIG. 3). Weights w (w1 to w3) are applied to the corresponding inputs x1 to x3. This causes the neuron to output the output y that is expressed by the equation below. Note that the inputs x, the output y, and the weights w are vectors. In the Equation (2) below, θ is a bias, and $f_k$ is an activation function.

$$y = f_k(\Sigma_{i=1}^n x_i w_i - \theta) \quad (2)$$

A three-layer neural network includes a combination of neurons shown in FIG. 3 will now be described with reference to FIG. 4A. As shown in FIG. 4A, a plurality of inputs x (inputs x1 to x3 are provided herein as an example) are inputted from the left side of the neural network, and results y (results y1 to y3 are provided herein as an example) are output from the right side of the neural network. Specifically, the inputs x1, x2, and x3, to which the corresponding weights have been applied, are respectively input to three neurons N11 to N13.

These weights applied to the inputs are collectively designated by w1.

The neurons N11 to N13 respectively output z11 to z13. In FIG. 4A, these z11 to z13 are collectively designated by a feature vector Z1, and may be treated as a vector obtained by extracting a feature quantity of an input vector. This feature vector Z1 is a feature vector between the weight w1 and the weight w2. The feature vectors z11 to z13, to which the corresponding weights have been applied, are inputted to two neurons N21 and N22. These weights applied to the feature vectors are collectively designated by W2.

The neurons N21 and N22 respectively output z21 and z22. In FIG. 4A, these z21 and z22 are collectively designated by a feature vector Z2. This feature vector Z2 is a feature vector between the weight W2 and the weight W3. The feature vectors z21 and z22, to which the corresponding weights have been applied, are input to three neurons N31 to N33. These weights applied to the feature vectors are collectively designated by W3.

Finally, the neurons N31 to N33 respectively output the results y1 to y3. The operation of the neural network includes a learning mode and a value prediction mode. For example, a learning dataset is used to learn the weights W in the learning mode, and parameters obtained from the learning are used to determine the action of the robot in the prediction mode. Note that, for convenience, the term "prediction" is used herein, but various tasks including detection, classification, deduction, etc. may be performed.

It is possible to perform not only learning (online learning), in which data that have been acquired by actually operating the robot in the prediction mode are immediately learned, and are reflected in a subsequent action, but also learning (batch learning), in which previously collected data are collectively learned using a group of the data, and thereafter, a detection mode is performed using parameters obtained from the learning. Another intermediate learning mode may be interposed every time, predetermined amount of data are collected.

The weights W1 to W3 may be learned by an error backpropagation method. The information on errors is introduced from the right side to the left side. The error backpropagation method is a method for adjusting (learning) each weight so as to reduce a difference between the output y when the input x is input and the true output y (teacher) in each neuron. In such a neural network, two layers or four or more layers may be provided (This is called deep learning when the number of layers is increased). An arithmetic device, which extracts features from input data, in a stepwise fashion, to return a result, may be automatically acquired from only teacher data.

Figure 4B:
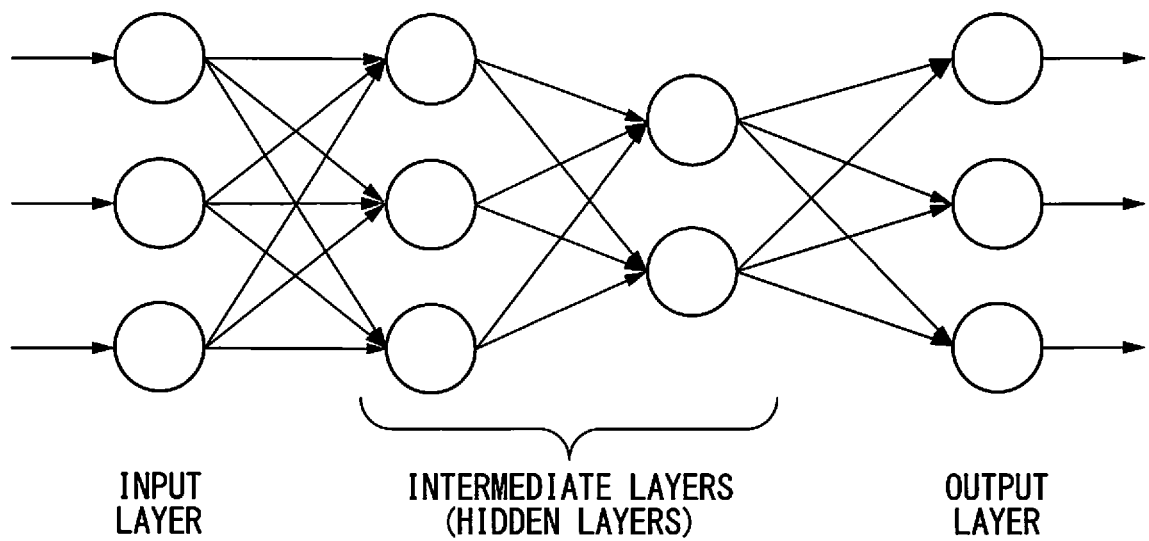

FIG. 4B shows a neural network which has, as in FIG. 4A, three calculation layers referred to as an input layer, intermediate layers (hidden layers), and an output layer. The machine learning device 5 of this embodiment includes, in order to use the neural network, the image input 51, the preprocessing unit 52, the recognition unit 53, and the learning unit 54. However, the machine learning method applied to the present invention is not limited to the neural network. Further, as described above, the machine learning (the machine learning device 5) may be realized by, for example, GPGPU or a large-scale PC cluster. In this embodiment, among various machine learning methods, the aforementioned supervised learning using the above described neural network is performed. As described above, in this embodiment, various methods may be adopted.

Figure 5A:
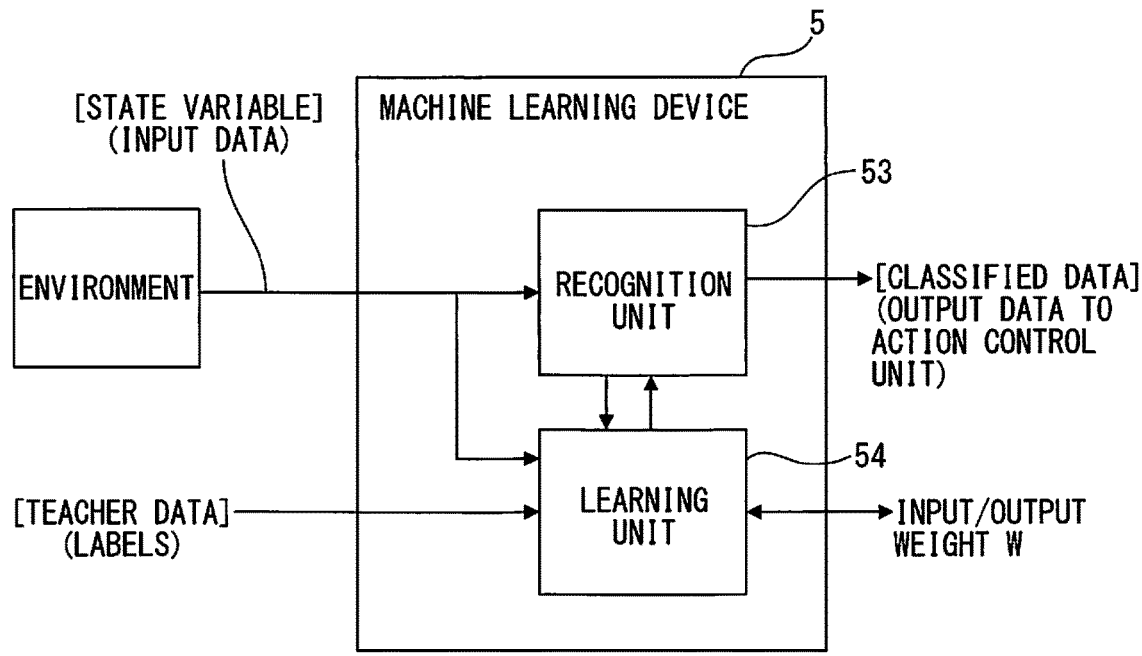
FIG. 5A and FIG. 5B are explanatory views of an example of a recognition unit and a learning unit in the robot system shown in FIG. 2.
Figure 5B:
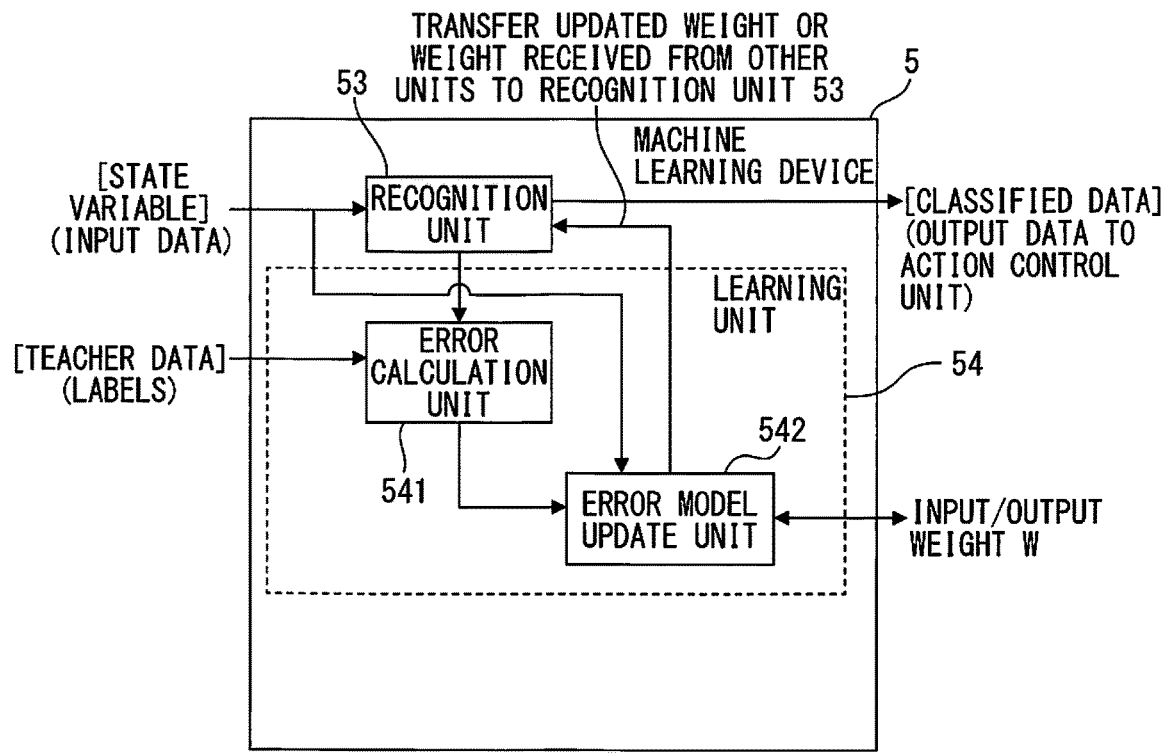

FIG. 5A and FIG. 5B are explanatory views of an example of a recognition unit and a learning unit of the robot system shown in FIG. 2, and explain the recognition unit 53 and the learning unit 54 of the machine learning device 5, to which "supervised learning" is applied, in the control device 2 of the robot system 3 of this embodiment. FIG. 5A is a block diagram of input and output signals of the recognition unit 53 and the learning unit 54. FIG. 5B is a block diagram of examples of the recognition unit 53 and the learning unit 54, to which "supervised learning" is applied. As shown in FIG. 5A, state variable (input data) for observing the state of environment from the outside are input to the recognition unit 53 in the machine learning device 5, and state variable (input data) as well as teacher data (labels) (also referred to as correct answer labels, correct answer data) are input to the learning unit 54 (When learning datasets are given, "certain data and teacher data (labels)" are input).

As shown in FIG. 5B, the learning unit 54 includes an error calculation unit 541 and an error model update unit (learning model update unit) 542. The error calculation unit 541 receives teacher data (labels) and outputs (the outputs of the output layer and the intermediate layer), to perform a calculation (e.g., squared error calculation) of errors (differences) between the teacher data (labels) and the outputs from the recognition unit 53. Based on the errors (differences), an error function (objective function) is calculated.

Then, the error model update unit 542 updates a learning model, to reduce the errors (Based on the error function (objective function), the weight W is updated by, for example, an error backpropagation algorithm/gradient-descent method).

In initial learning (learning using learning datasets), state variable (input data) correspond to, for example, image data, by which what is represented is obvious, and teacher data (labels) correspond to, for example, data that represent which output is effective in the output layer that will be described later in detail with reference to FIG. 29. Specifically, regarding, for example, an image input in a "screwing operation in unit A", the output C is effective for the teacher data (labels).

These learning datasets are used, so that the error calculation unit 541 receives, as inputs, for example, the outputs of the recognition unit 53 in response to the image inputs, and teacher data, to calculate errors therebetween. Based on the errors (differences), an error function (objective function) is calculated. The error model update unit 542 updates the learning model to reduce the errors (Based on the error function (objective function), the weight W is updated by, for example, an error backpropagation algorithm/gradient-descent method).

When the weight W is updated, the updated weight W is transferred to the recognition unit 53. Note that, when the error model update unit 542 receives the weight from another unit, such as a controller, the received weight is transferred to the recognition unit 53.

In recent years, a method, in which "a random value is input" as the initial weight W, has been used, and accordingly, the initial value of the weight W may be a random value. Further, examples of the learning dataset include, for example, data stored in a non-volatile memory, such as a flash memory contained in the control device 2, the machine learning device 5, the learning unit 54, or the recognition unit 53, data stored in a cell controller or a management controller, data provided online via a communication line, or data input from a USB. This description does not specify how to give the learning dataset or where the learning dataset is stored.

Figure 29:
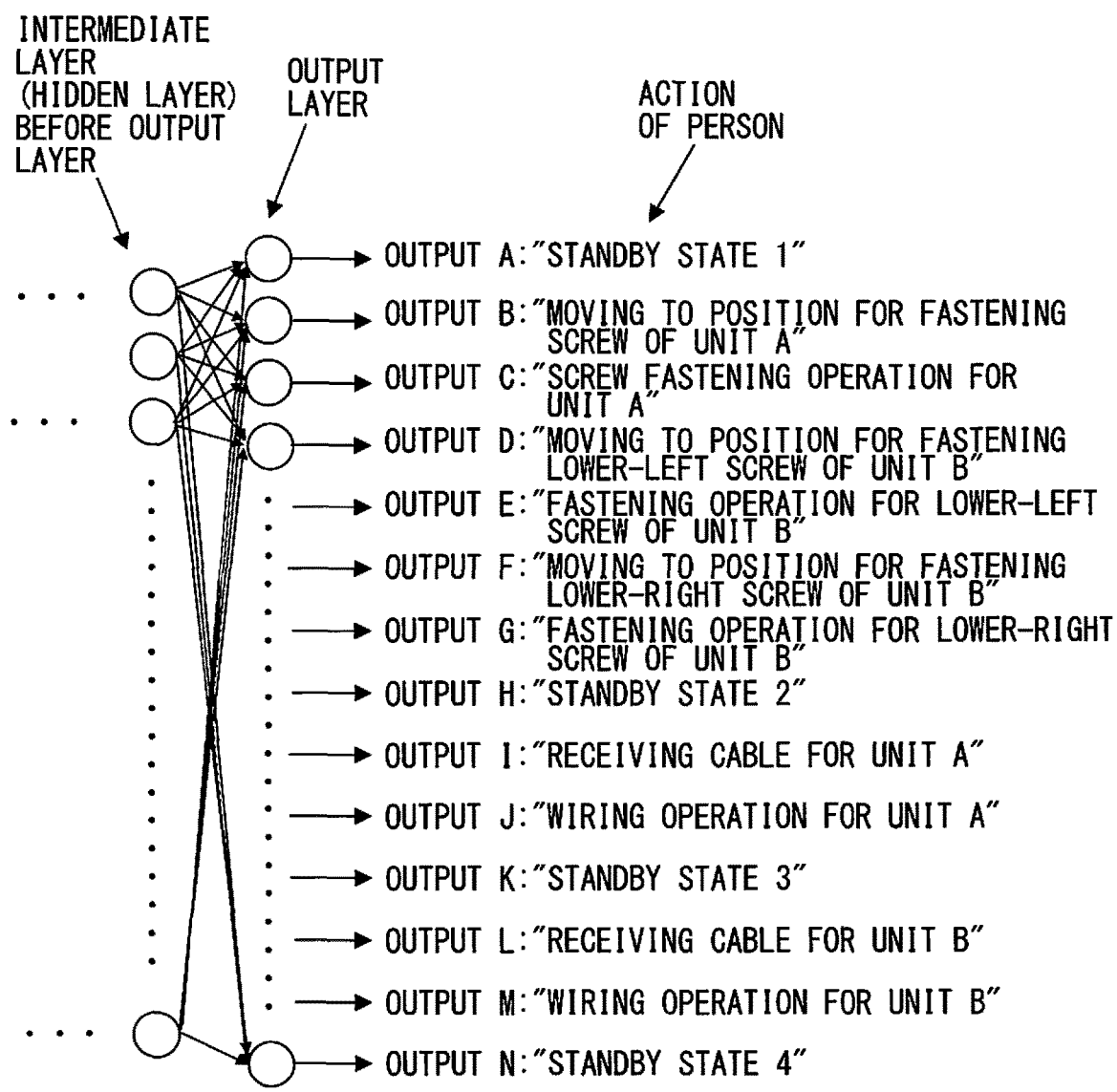
FIG. 29 is a view of an output layer of a neural network and a layer (the last layer of intermediate layers (hidden layers)) before the output layer.
Figure 30:
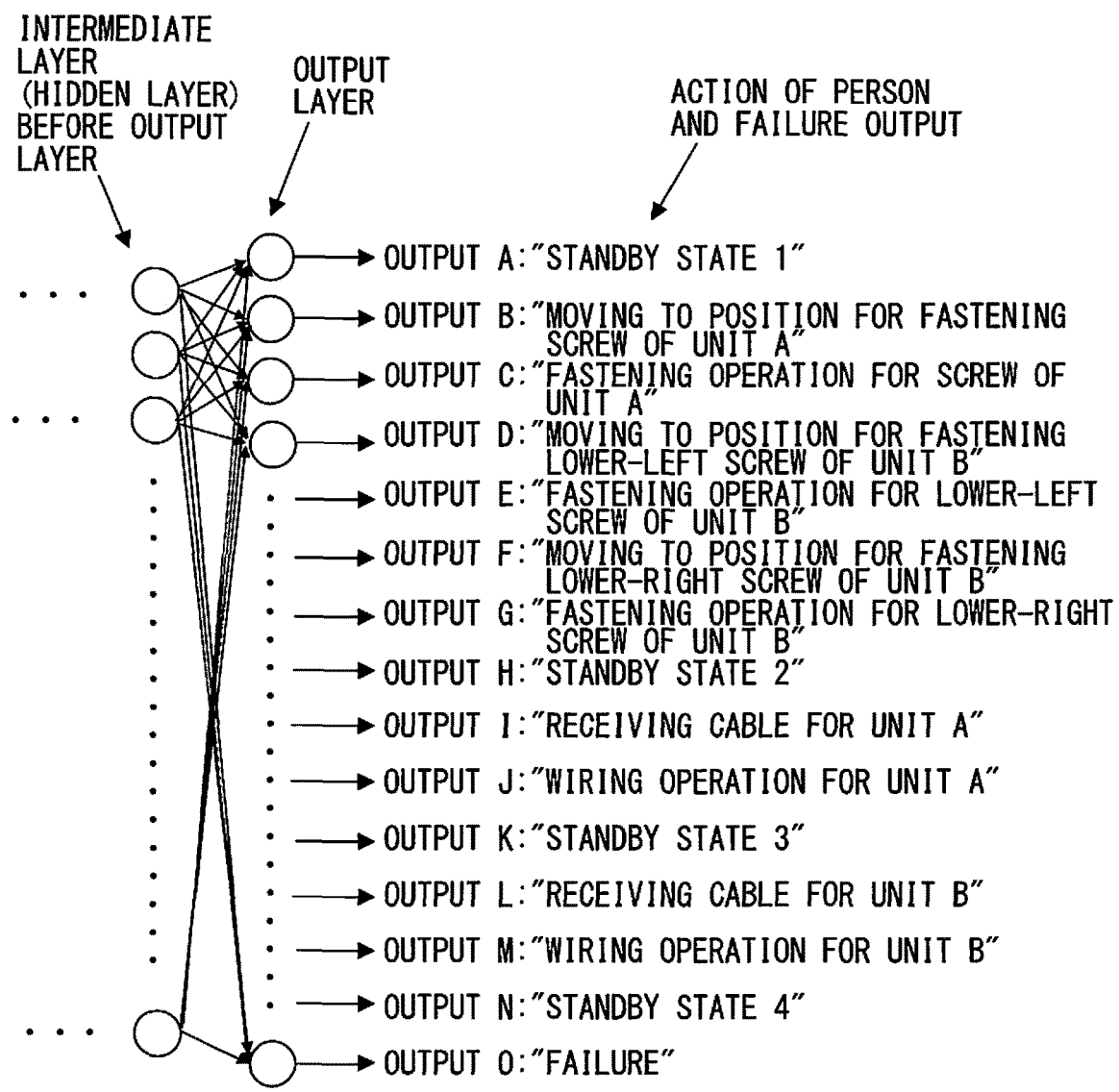
FIG. 30 is a view of the state in which a "failure" is output in the neural network shown in FIG. 29.

When used in an actual operation, the recognition unit 53 inputs the outputs of image data of the preprocessing unit 52 as state variable (input data), and calculates, from the inputs in the neural network, outputs in FIG. 29 or 30, to obtain values of the outputs. When the value of the output (e.g., the output C) is effective, the fact that the output (e.g., the output C) is effective is conveyed to the action control unit, and the value of the output (one of the outputs of the output layer and the intermediate layers, e.g., the output C) is input to the error calculation unit 541. The error calculation unit 541 calculates errors between the values of the outputs of the output layer and the teacher data. Based on the errors (differences), an error function (objective function) is calculated. The error calculation unit 541 inputs the error function (objective function) and the outputs from the recognition unit 53 to the error model update unit 542, and the error model update unit 542 updates the weight W by, for example, an error backpropagation algorithm/gradient-descent method, based on the error function (objective function).

In FIG. 5B, the outputs of the output layer and the intermediate layer are transferred from the recognition unit 53 to the error calculation unit 541. However, the outputs may be transferred to both the error calculation unit 541 and the error model update unit 542. In FIG. 5B, state variable (state quantity or input data) are input to the error model update unit 542. However, the state variable may be transferred from the recognition unit 53 to the error model update unit 542. Further, the values of the outputs given from the recognition unit 53 to the error calculation unit 541 include information regarding which output (e.g., the output C) is effective in the output layer of FIG. 29 or 30 that will be described later in detail, and a failure signal in FIG. 30 (As will be described later, when an operation has been normally shifted to a next operation and the operation has been completed, if the operation is not treated as "fail", the operation is treated as success).

Figure 6A:
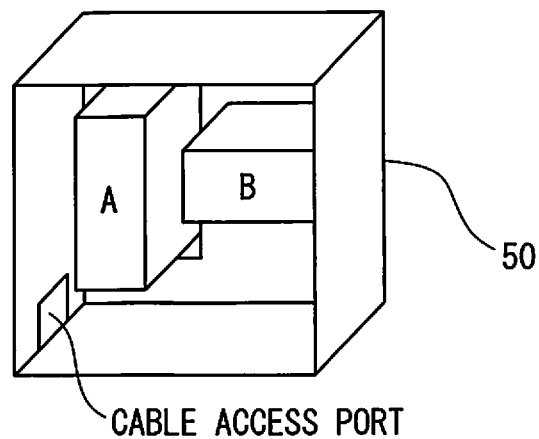
FIG. 6A, FIG. 6B and FIG. 6C are explanatory views of an example of a target object.
Figure 6B:
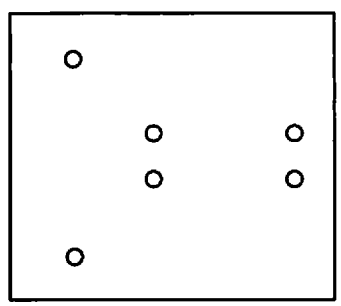
Figure 6C:
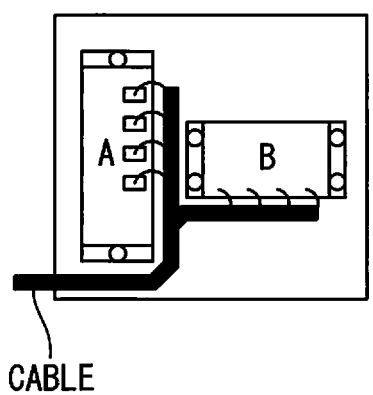

FIG. 6A, FIG. 6B and FIG. 6C are views for explaining an example of the target object. FIG. 6A shows that units A and B are mounted in the target object 50. FIG. 6B shows that no units are mounted in the target object 50. FIG. 6C shows that units A and B and a cable are mounted in the target object 50.

Figure 7A:
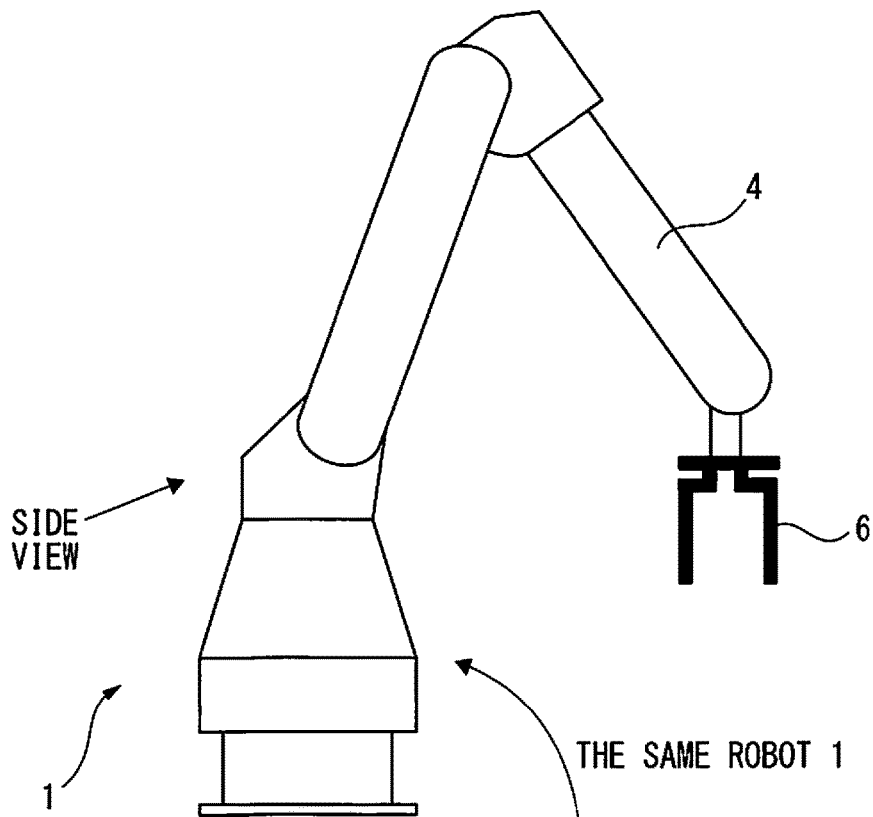
FIG. 7A, FIG. 7B and FIG. 7C are views of a robot seen from the ceiling or the side.
Figure 7B:
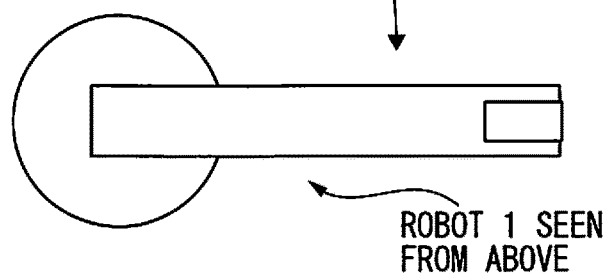
Figure 7C:
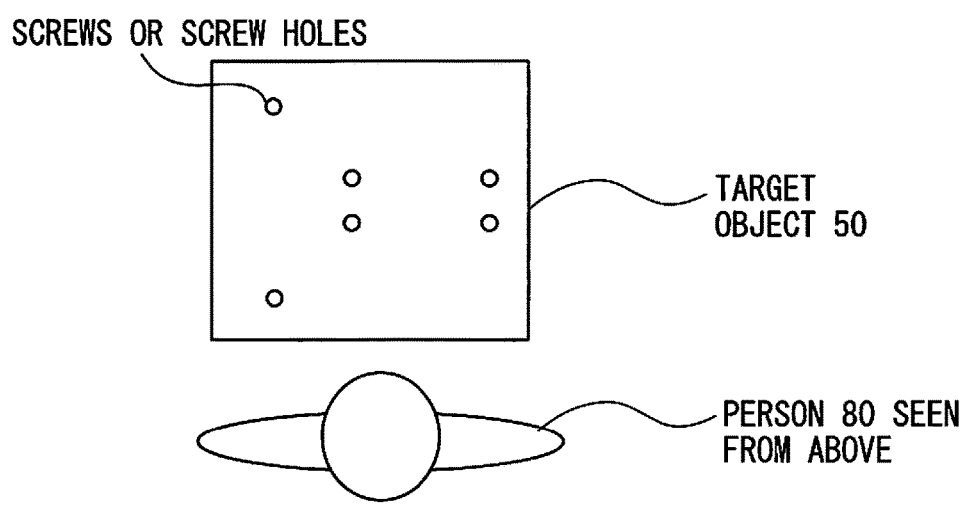

FIG. 7A, FIG. 7B and FIG. 7C are views of an example of the state of a robot seen from the ceiling or the side. FIG. 7A is a side view of the robot 1. FIG. 7B is a view of the robot 1 seen from the above. FIG. 7C is a view of the target object 50 and the person (operator) 80, which are seen from above. Note that the target object 50 is placed so that its mounting portion faces toward the ceiling in FIG. 7A to FIG. 7C. The portions shaped like "O" in the target object 50 represent screws or screw holes. FIG. 8A, FIG. 8B, FIG. 8C and FIG. 8D are explanatory views of an example in which a screw in a target object is engaged in a hole of a unit. FIG. 8A to FIG. 8D represent the flow of time in the process.

As shown in FIG. 7C, the target object 50 has screws and screw holes. This is because, for example, when the incompletely fastened screw shown in FIG. 8B is inserted, as shown in FIG. 8C, in the screw hole portion of the unit shown in FIG. 8A, which is composed of a hole larger than the head of a screw and a hole slightly larger than the diameter of the screw, and then, the unit is moved as shown in FIG. 8D, "O" in the target object 50 in FIG. 7C is a screw, not a screw hole.

FIG. 7A to FIG. 7C show the head and the shoulder of the person 80, the robot 1, and the target object 50 therebetween, which are seen from above. Note that the units A and B and the cable to be mounted are placed within the reach of the arm 4 (not shown) of the robot 1. The robot 1 seen from the side face is shown above the robot 1 seen from above (on the upper portion of the paper). The robot 1 seen from above and the robot 1 seen from the side face are the same robot. Note that, although not illustrated, the camera 8 is placed so as to recognize the face and the action of the person 80.

In FIG. 2, the camera 8 is placed on the floor via a pole. However, if the camera 8 disturbs the action of the robot 1, or the robot 1 interrupts the image of the person 80, the camera 8 may be hung from the ceiling, to photograph the face and the action of the person 80. Alternatively, if there is a wall in the vicinity, the camera may be provided on the wall.

Figure 28:
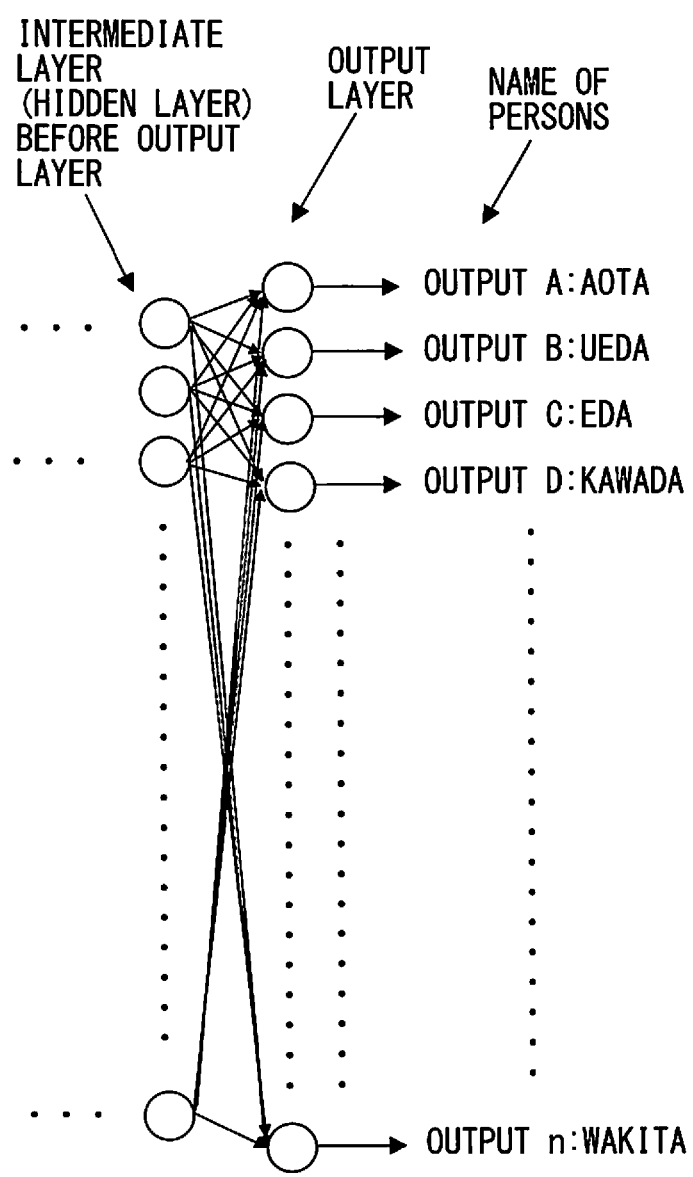
FIG. 28 is a view for explaining an example in which face authentication is performed using a neural network.
Figure 31:
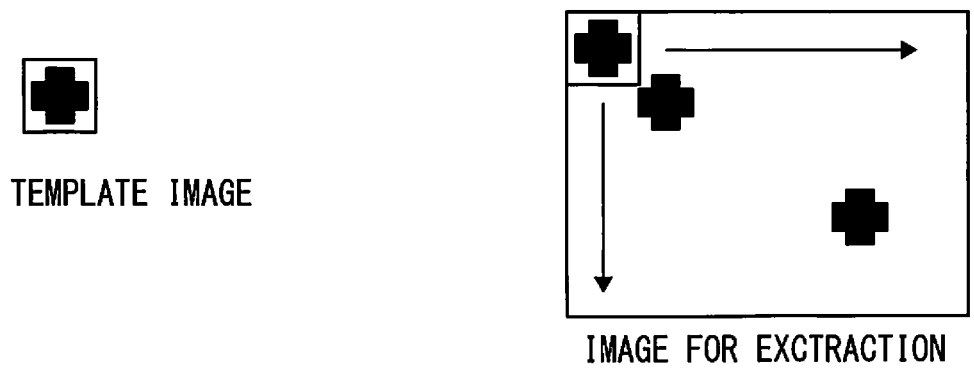
FIG. 31 is a view for explaining an example of template matching.

The authentication of the face may be performed using a neural network as shown in FIG. 28 that will be described later, but may also be performed using template matching. The template matching will be briefly described. In order to examine whether there is a desired image referred to as a "template" in images to be extracted, the template moves little by little, for example, from the upper left end to the upper right end as shown in FIG. 31, to find the similarity between the template and each image by calculation. The template moves to a position slightly lower than the upper left end after reaching the right end, and then performs a calculation in a similar manner. In this instance, the examination is completed when the template reaches the bottom right end. The examination method (e.g., a method using normalized correlation or a method using a geometric configuration), the preprocessing, the speeding up are omitted because they are well known.

FIG. 28 is a view for explaining an example, in which face authentication is performed using a neural network, and represents the output layer and its previous layer (the last one of the intermediate layers (hidden layers)) in the neural network. If the value (probability) of an output of the output layer is equal to or larger than a predetermined value, the output is effective. If, for example, the value (probability) of the output C is equal to or larger than a predetermined value, it is determined that the person is Mr./Ms. Eda. As seen above, if the value (probability) of an output of the output layer is equal to or larger than a predetermined value, the output is effective. However, it is also possible to determine that the output is effective, if the value (probability) of an output of the output layer is equal to or larger than a predetermined value, and if the difference with the other output is equal to or larger than a predetermined value. Regarding the method for determining whether an output is effective, the simplest method has been described.

However, other methods may be adopted. The aforementioned idea, in which, if the value (probability) of an output of the output layer is equal to or larger than a predetermined value, the output is effective, is also adopted in the above descriptions. Note that the neural network and the template matching may be combined.

In the above descriptions, in this embodiment, the method for authentication of the face is not limited to the use of the neural network or template matching, and other various methods may also be adopted. In other words, any methods, which may authenticate the face, other than the use of the neural network and the template matching may be used.

FIG. 9A, FIG. 9B and FIG. 9C are, as in FIG. 7A, FIG. 7B and FIG. 7C, views showing a target object which does not have units and cables is placed at a predetermined position. Note that FIG. 9A to FIG. 9C correspond to FIG. 7A to FIG. 7C. FIG. 10 to FIG. 15 are views for explaining an example in which a unit is mounted in the target object shown in FIG. 9A to FIG. 9C, and screws are fastened.

In FIG. 9A to FIG. 9C, when the target object 50, in which units and cables are not mounted, is placed at a position shown in the drawings, for example, the camera 7 on the ceiling performs image recognition of the positions of the screws or screw holes by which the units A and B are mounted, and then, position adjustment is performed, and then, time measurement starts, and assembling is begun. The time measurement is performed for the time from the start to the end of assembling, and the motion time and downtime of the person 80 and the robot 1 at every operation. In an example, these data are processed by a cell controller that will be described later. However, the device for processing these data is not limited to this cell controller. The control device 2 may process the data, or a management controller may process the data. In this embodiment, screws or screw holes are used. However, a plurality of markers may be provided, to perform image recognition.

Figure 10:
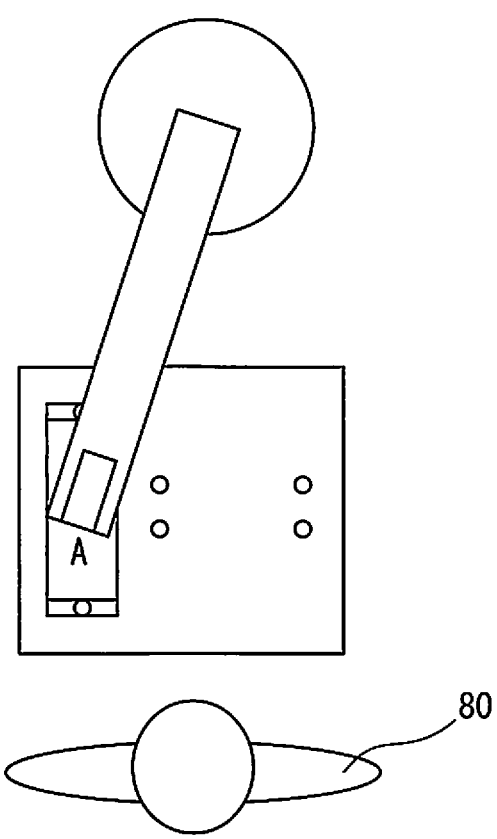
FIG. 10 is a (first) view for explaining an example in which a unit is mounted on the target object shown in FIG. 9A to FIG. 9C, and screws are fastened.

FIG. 9A to FIG. 9C show, in the side view, the state in which the unit gripping hand 6-1 of the robot 1 grips the unit A from a not-illustrated table for units, and makes arrangements for mounting the unit A in the target object 50. In this respect, the fact that a part of the body of the person photographed by the camera 7 on the ceiling does not exist in the vicinity of the portion of the target object 50, to which the unit A is to be mounted, is confirmed by image recognition, and, as shown in FIG. 10, the arm 4 of the robot 1 is moved to a mounting position of the unit A in the target object 50, to mount the unit A. In this instance, in the case where it is determined that the person interferes with the arm 4 of the robot 1 or the unit A, such as the case where a part of the body of the person enters the area around the unit A, or the case where a part of the body of the person enters the movement locus of, e.g., the arm 4 of the robot 1, the arm 4 of the robot 1 is reduced in speed or stopped so as not to damage the person. The area where the reduction in speed of the arm 4 is required if the person enters therein, or the area where the stop of the arm 4 is required if the person enters therein, may be freely set.

In the method for performing image recognition of the fact that a part of the body of the person enters the area around the unit A, or a part of the body of the person enters the movement locus of, for example, the arm 4 of the robot 1, an outline is extracted from images stored in the camera 7 and the camera 8, and whether the outline is found in the vicinity of the unit or on the movement locus is determined. A Sobel filter or the like is used to extract the outline. However, the explanation of such a filter is omitted because the filter is already a known technology. Note that, of course, other various methods may be adopted as a method for performing image recognition of the fact that a part of the body of the person enters the area around the unit A, or a part of the body of the person enters the movement locus of, for example, the arm 4 of the robot 1 FIG. 27 is a view for explaining an example of a configuration for confirming that a part of the body does not enter the inside of an enclosure of the target object. As shown in FIG. 27, in order to confirm that a part of the body does not enter the inside of the enclosure of the target object 50, image recognition of the outline of the target object 50 (e.g., a square shape in an example shown in FIG. 27) is performed to confirm that there is no disconnection in the square outline, and accordingly, a part of the body (the person 80) does not enter the inside of the enclosure of the target object.

In this instance, in order to emphasize the sides constituting a square shape, it is preferable to slightly illuminate the target object 50 from the back (bottom) side.

Figure 11:
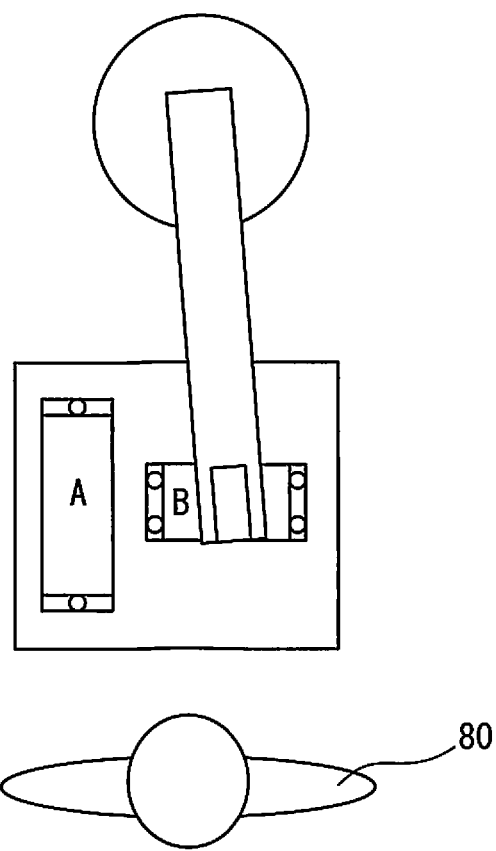
FIG. 11 is a (second) view for explaining an example in which a unit is mounted on the target object shown in FIG. 9A to FIG. 9C, and screws are fastened.

When the unit A is mounted on a mounting position for the unit A in the target object 50 by the robot 1, the arm 4 of the robot 1 returns to, for example, the original position, and then, grips the unit B from a not-illustrated table for units, and makes arrangements for mounting the unit B in the target object 50. The fact that a part of the body of the person photographed by the camera 7 on the ceiling does not exist in the vicinity of the portion of the target object 50, to which the unit B is to be mounted, is confirmed by image recognition, and, as shown in FIG. 11, the unit B is mounted on a mounting position of the unit B in the target object 50. In this instance, if a safety problem occurs, in which a part of the body of the person enters the area around the unit B, or a part of the body of the person enters the movement locus of, for example, the arm 4 of the robot 1, the arm 4 of the robot 1 is reduced in speed or stopped so as not to hurt the person.

Figure 12:
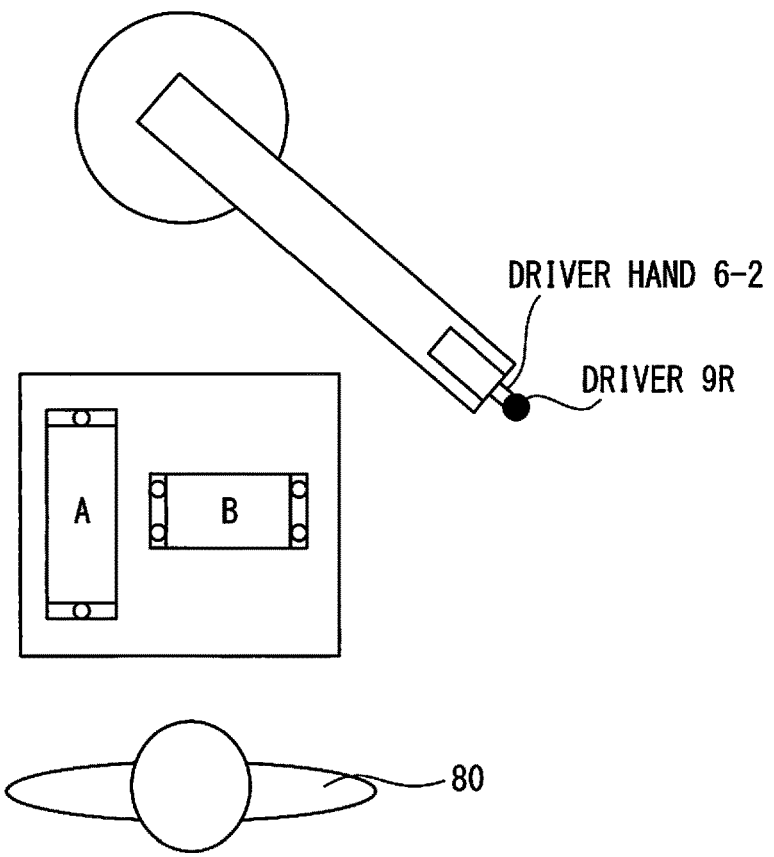
FIG. 12 is a (third) view for explaining an example in which a unit is mounted on the target object shown in FIG. 9A to FIG. 9C, and screws are fastened.

When the robot 1 mounts the unit B at a mounting position for the unit B in the target object 50, if a subsequent operation is, for example, an operation for fastening screws in cooperation with the person 80, the driver hand 6-2 having a driver 9R is mounted on the wrist of the robot 1 by a not-illustrated hand changer as shown in FIG. 12.

Figure 13:
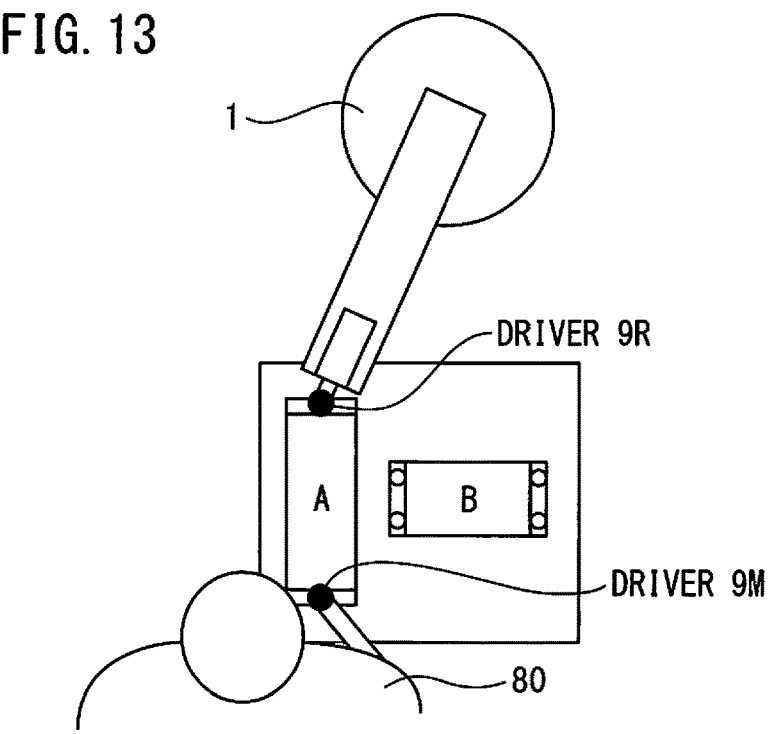
FIG. 13 is a (fourth) view for explaining an example in which a unit is mounted on the target object shown in FIG. 9A to FIG. 9C, and screws are fastened.
Figure 14:
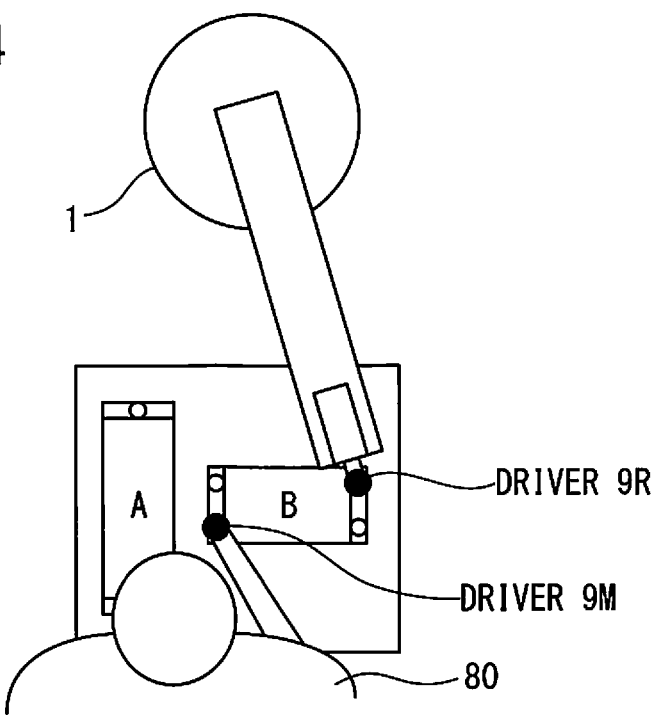
FIG. 14 is a (fifth) view for explaining an example in which a unit is mounted on the target object shown in FIG. 9A to FIG. 9C, and screws are fastened.
Figure 15:
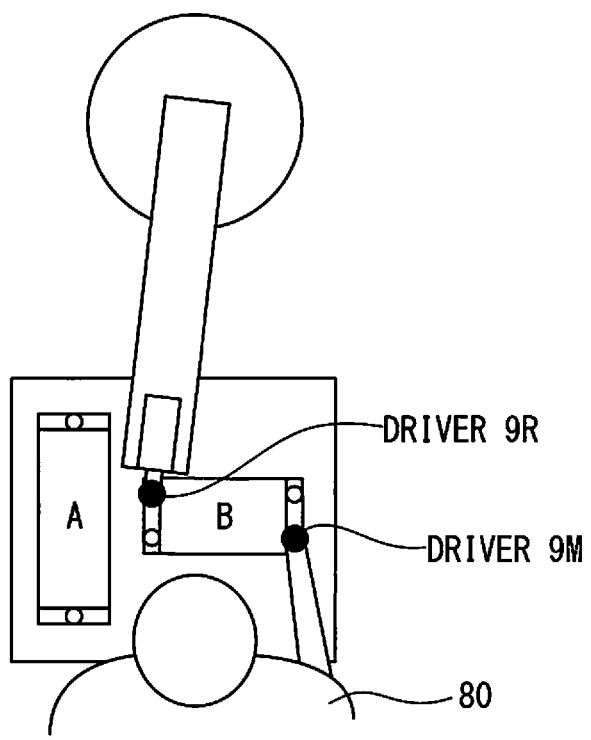
FIG. 15 is a (sixth) view for explaining an example in which a unit is mounted on the target object shown in FIG. 9A to FIG. 9C, and screws are fastened.

When the person (arm of the person) 80 and a driver 9M move to a position for fastening a screw of the unit A as shown in FIG. 13, the arm 4 of the robot 1 moves to a position for fastening a screw of the unit A, and starts to fasten the screw using the driver hand 6-2. When finishing fastening the screw of the unit A, the person (arm of the person) 80 and the driver 9M move from the unit A to the lower-left corner of the unit B, and the arm 4 of the robot 1 moves from the unit A to the upper-right corner of the unit B. After these movements, the person 80 fastens the lower-left screw of the unit B in FIG. 14, and the robot 1 fastens the upper-right screw of the unit B.

Further, the person (arm of the person) 80 and the driver 9M move from the lower-left corner of the unit B to the lower-right corner of the unit B, and the arm 4 of the robot 1 moves from the upper-right corner to the upper-left corner of the unit B. After these movements, the person 80 fastens the lower-right screw of the unit B in FIG. 15, and the robot 1 fastens the upper-left screw of the unit B.

An operation for wiring a cable necessary for the unit A and the unit B will now be described with reference to FIG. 16A to FIG. 25 ("Wiring" means placing and connecting a cable in the unit, or securing a cable by, for example, a tie-wrap band along a route). FIG. 16A to FIG. 16C are views showing the state in which units are mounted in the target object in FIG. 7A to FIG. 7C and FIG. 9A to FIG. 9C, and screws are fastened. Note that FIG. 16A to FIG. 16C correspond to FIG. 7A to FIG. 7C or FIG. 9A to FIG. 9C.

Figure 17:
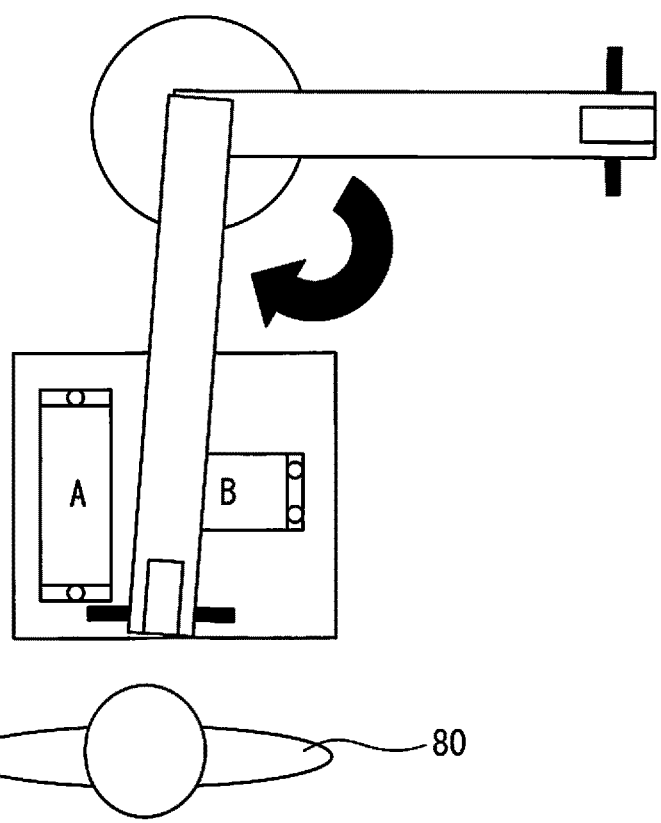
FIG. 17 is a (first) view for explaining an example of treatment for the target object shown in FIG. 16A to FIG. 16C.

First, wiring a cable for the unit A will be described. In FIG. 16A, in the robot 1, a not-illustrated hand changer replaces the driver hand 6-2 with the cable gripping hand 6-1, and then, the cable gripping hand 6-1 of the robot 1 grips the cable for the unit A from a not-illustrated table for cables, and holds the cable. Regarding the movement, the fact that, e.g., the person photographed by the camera 7 on the ceiling does not exist on the movement locus of, e.g., the arm 4 of the robot 1, is confirmed by image recognition, and, as shown in FIG. 17, the action control unit 43 controls the arm 4 of the robot 1 so that the arm 4 moves to an appropriate position in the target object 50. In this respect, if a safety problem occurs, in which a part of the body of the person enters the movement locus of, e.g., the arm 4 of the robot 1, the arm 4 of the robot 1 is reduced in speed or stopped so as not to hurt the person. The area where the reduction in speed of the arm 4 is required if the person enters therein, or the area where the stop of the arm 4 is required if the person enters therein, may be freely set.

Figure 18:
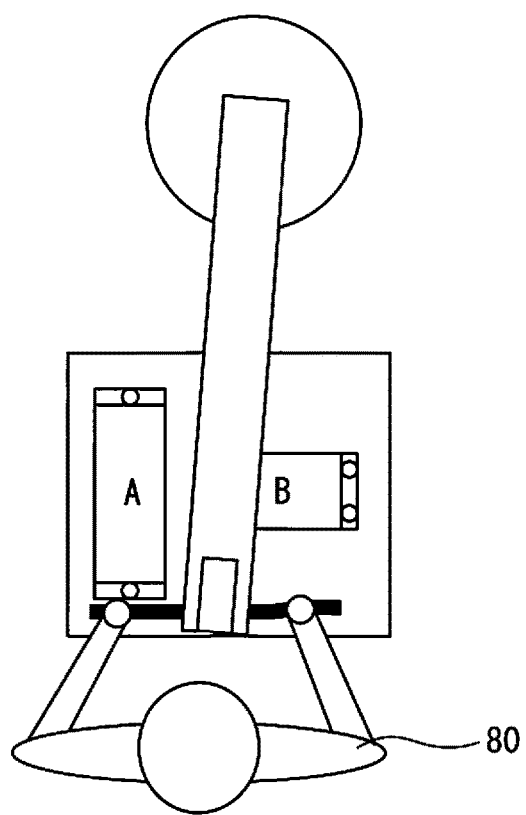
FIG. 18 is a (second) view for explaining an example of treatment for the target object shown in FIG. 16A to FIG. 16C.

After the cable gripping hand 6-1 of the robot 1 stops at an appropriate position, when the person 80 grips the cable for the unit A as shown in, e.g., FIG. 18, to receive the cable for the unit A, the value of the force sensor 49 of the robot 1 changes (reduces), and accordingly, the action control unit 43 of the control device 2 determines that the person 80 has received the cable for the unit A, and controls the arm 4 of the robot 1 so that the arm 4 moves away from the person. The robot 1 grips, as a subsequent action, a cable for the unit B from a not-illustrated table for cables, and holds the cable.

FIG. 19 shows that the person 80 performs the wiring of the cable for the unit A. In order to reduce the moving time of the arm of the robot 1, the cable for the unit B may previously be moved. However, if it is determined that the arm may interfere with the person or the operation when, e.g., the person 80 is in work, it is preferable to move the arm of the robot 1 to a standby (action standby) position, such as a "robot arm nearby standby position example" in FIG. 20, which is slightly away from the last position of the arm gripping the cable. Note that the standby position may be freely set. If it is determined that there is no possibility that the arm may interfere with or interrupt the person (the arm 4 of the robot 1 may collide with the person 80), the robot 1 may move, at a reduced speed, to the last position of the arm 4 of the robot 1 without standbying.

Figure 21:
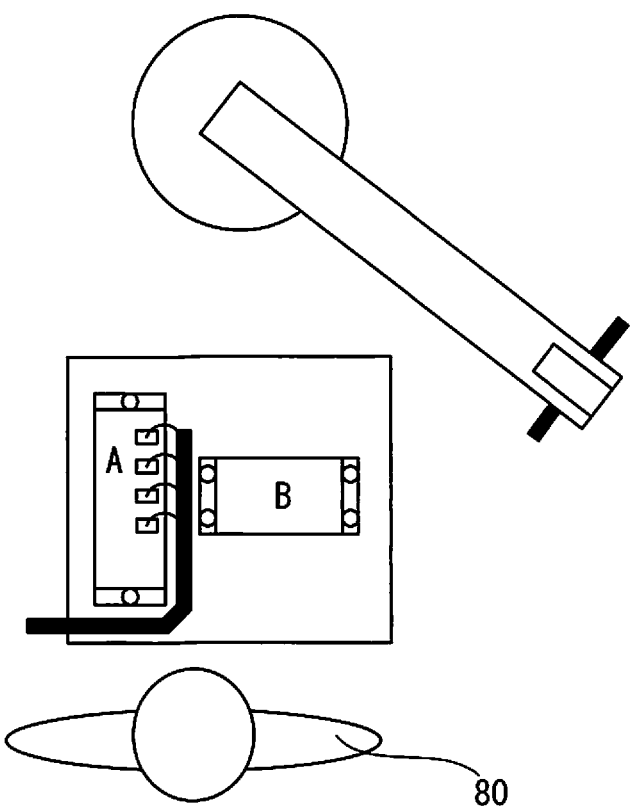
FIG. 21 is a (fifth) view for explaining an example of treatment for the target object shown in FIG. 16A to FIG. 16C.
Figure 22:
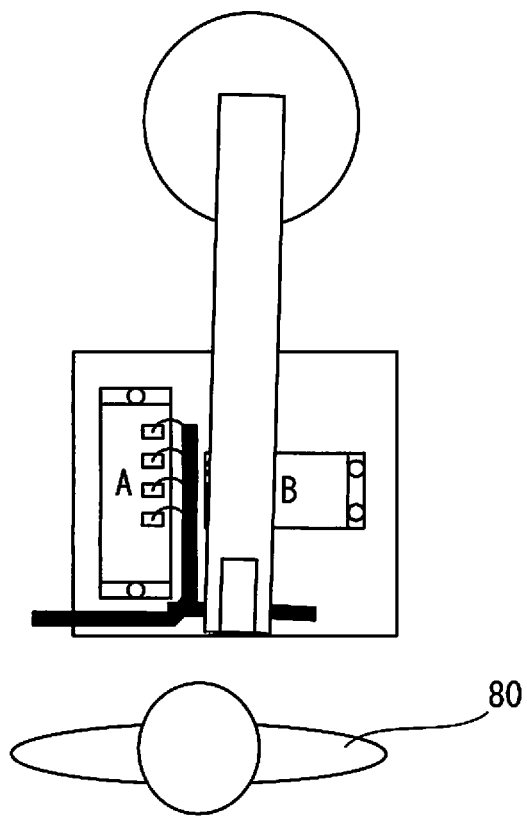
FIG. 22 is a (sixth) view for explaining an example of treatment for the target object shown in FIG. 16A to FIG. 16C.
Figure 23:
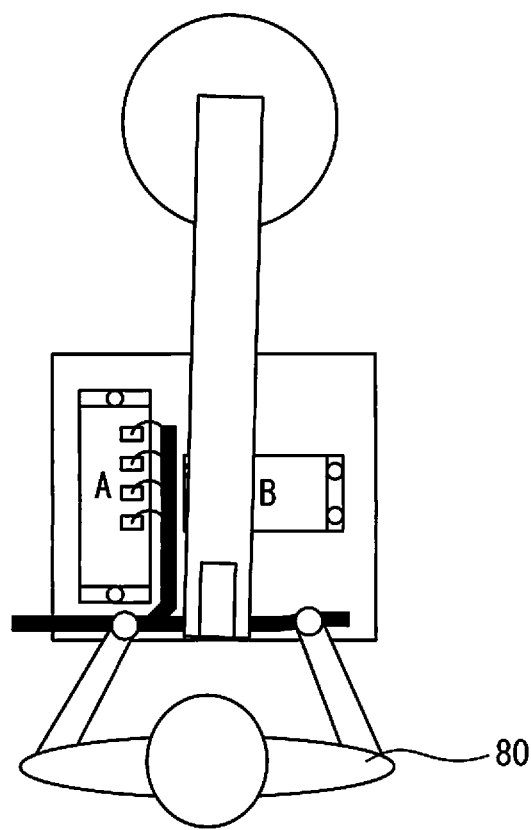
FIG. 23 is a (seventh) view for explaining an example of treatment for the target object shown in FIG. 16A to FIG. 16C.

FIG. 21 shows an example in which the person 80 finishes an operation (the wiring of the cable for the unit A in this case), and is ready and waiting. When the person 80 is ready and waiting, the arm 4 of the robot 1 restarts to move (action restart). FIG. 22 shows an example in which the arm restarts to move to bring the cable for the unit B to an appropriate position. When the cable gripping hand 6-1 of the robot 1 stops at the appropriate position, the person 80 grips the cable for the unit B, as described in, e.g., FIG. 23, to receive the cable for the unit B. This causes the value of the force sensor 49 of the robot 1 to change (reduce), and accordingly, the action control unit 43 of the control device 2 determines that the person 80 has received the cable for the unit B, and controls the arm 4 of the robot 1 so that the arm 4 moves away from the person.

Figure 24:
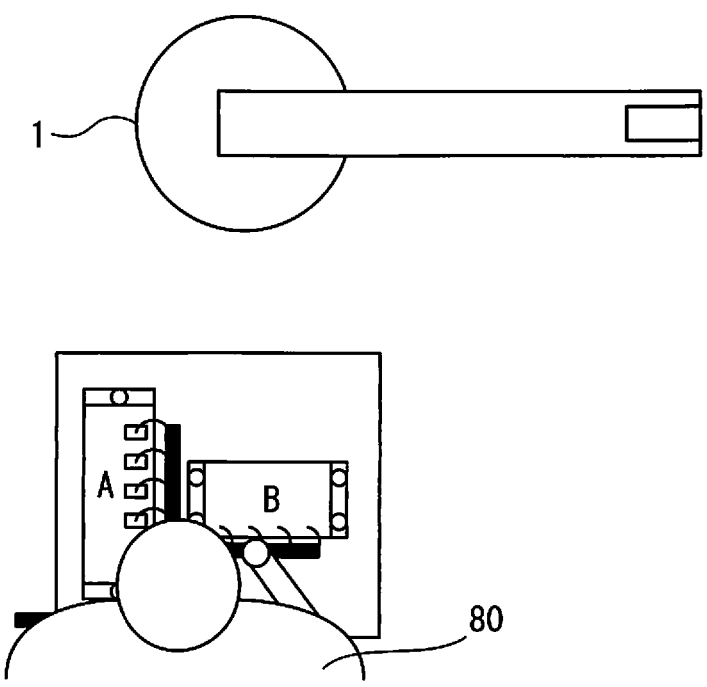
FIG. 24 is a (eighth) view for explaining an example of treatment for the target object shown in FIG. 16A to FIG. 16C.

FIG. 24 shows that the person 80 performs the wiring of the cable for the unit B, and, in FIG. 25, the operation is finished (the target object 50 is completed). FIG. 26 is an explanatory view of an example of the state in which the target object 50 is discharged.

The action of the person 80 and the action of the robot will now be described in detail. FIG. 29 is a view of an output layer of a neural network and a layer (the last layer of intermediate layers (hidden layers)) before the output layer. Assuming that the outputs of the output layer include an output A, i.e., "standby state 1" to an output N, i.e., "standby state 4". Depending on the configuration, as shown in FIG. 30, "failure" is output as, e.g., an output O that will be described later. Whether the person (arm of the person) 80 and the driver 9M move to a position for fastening a screw of the unit A is determined by whether the value (probability) of the output B of the output layer in FIG. 29 is equal to or larger than a predetermined value (assuming that it is determined by whether the value (probability) of the output B of the output layer is equal to or larger than a predetermined value). When the value (probability) of the output B is equal to or larger than a predetermined value, the recognition unit 53 recognizes (determines) that the person (arm of the person) 80 and the driver 9M "move to a position for fastening a screw of the unit A".

The action control unit 43 controls the arm 4 of the robot 1 so that the arm 4 moves to a position for fastening a screw of the unit A.

The aforementioned example describes that, after the person (arm of the person) 80 and the driver 9M move to the "position for fastening a screw of the unit A", the arm 4 of the robot 1 moves to the position for fastening a screw of the unit A. However, this description is made to easily understand that the action of the robot 1 is decided based on the action of the person 80. Actually, the outputs in FIG. 29 are more finely divided, and the arm 4 of the robot 1 is controlled to move to the position for fastening a screw of the unit A as soon as the person (arm of the person) 80 and the driver 9M start to move to the position for fastening a screw of the unit A.

Regarding the operation of this movement, detection of object movement may be performed by, e.g., template matching. The method that will be described later using FIG. 32 and FIG. 33 may be applied, but the detection of object movement may be performed by, e.g., making a mark at a position that may surely be seen from the camera, and tracking the movement of the mark by template matching. As seen above, FIG. 29 merely shows a part of the idea, and the idea for controlling the robot 1 based on the action of the person in the present invention is not limited to the embodiment shown in FIG. 29.

In this respect, when the value (probability) of the output C in FIG. 29 is equal to or larger than a predetermined value, the recognition unit 53 determines that "the screwing operation in the unit A" is performed by the person (arm of the person) 80 and the driver 9M. The action control unit 43 controls the robot 1 so that the robot 1 fastens a screw of the unit A using the driver 9R of the driver hand 6-2 of the robot 1 (see FIG. 13).

When the value (probability) of the output D in FIG. 29 is equal to or larger than a predetermined value, the recognition unit 53 determines that the person (arm of the person) 80 and the driver 9M moves to a "position for fastening the lower-left screw of the unit B". The action control unit 43 controls the robot 1 so that the robot 1 may move to an upper-right position, to fasten the screw of the unit B using the driver 9R of the driver hand 6-2 of the robot 1. Further, when the value (probability) of the output E in FIG. 29 is equal to or larger than a predetermined value, the recognition unit 53 determines that "the screwing operation for the lower-left screw in the unit B" is performed by the person (arm of the person) 80 and the driver 9M. The action control unit 43 controls the robot 1 so that the robot 1 may fasten the upper-right screw of the unit B using the driver 9R of the driver hand 6-2 of the robot 1 (see FIG. 14).

When the value (probability) of the output F in FIG. 29 is equal to or larger than a predetermined value, the recognition unit 53 determines that the person (arm of the person) 80 and the driver 9M have moved to a "position for fastening the lower-right screw of the unit B". The action control unit 43 controls the robot 1 so that the robot 1 may move to an upper-left position, to fasten the screw of the unit B using the driver 9R of the driver hand 6-2 of the robot 1. Further, when the value (probability) of the output G in FIG. 29 is equal to or larger than a predetermined value, the recognition unit 53 determines that "the screwing operation for the lower-right screw of the unit B" is performed by the person (arm of the person) 80 and the driver. The action control unit 43 controls the robot 1 so that the robot 1 may fasten the upper-right screws of the unit B using the driver 9R of the driver hand 6-2 of the robot 1 (see FIG. 15).

Further, when the value (probability) of the output H in FIG. 29 is equal to or larger than a predetermined value, the recognition unit 53 determines that the person 80 is in a "standby state 2". The action control unit 43 controls the robot 1 so that the robot 1 may grip and move the cable for the unit A (see FIG. 16A to FIG. 16C and FIG. 17). Further, when the value (probability) of the output I in FIG. 29 is equal to or larger than a predetermined value, the recognition unit 53 determines that the person 80 "receives the cable for the unit A. As described above, when the value in the force sensor 49 of the robot 1 changes, the action control unit 43 of the control device 2 determines that the person 80 has received the cable for the unit A, and controls the arm 4 of the robot 1 so that the arm 4 moves away from the person (see FIG. 18).

Then, the robot 1 grips and moves the cable for the unit B. When the value (probability) of the output J in FIG. 29 is equal to or larger than a predetermined value, the recognition unit 53 determines that the output J is "the wiring operation of the unit A". The action control unit 43 causes the robot 1 to be in a nearby standby mode (see FIG. 19 and FIG. 20). Further, when the value (probability) of the output K in FIG. 29 is equal to or larger than a predetermined value, the recognition unit 53 determines that the person 80 is in a "standby state 3". The action control unit 43 causes the robot 1 to restart to move (see FIG. 21 and FIG. 22).

Further, when the value (probability) of the output L in FIG. 29 is equal to or larger than a predetermined value, the recognition unit 53 determines that "receiving the cable for the unit B" is performed by the person 80. As described above, when the value in the force sensor 49 of the robot 1 changes, the action control unit 43 of the control device 2 determines that the person 80 has received the cable for the unit B, and controls the arm 4 of the robot 1 so that the arm 4 moves away from the person (see FIG. 23). Further, the value (probability) of the output M in FIG. 29 is equal to or larger than a predetermined value; the recognition unit 53 determines that the output M represents "the wiring operation for the unit B". The action control unit 43 controls the robot 1 so that the stop (standby) of the robot 1 continues (see FIG. 24).

When the value (probability) of the output N in FIG. 29 is equal to or larger than a predetermined value, the recognition unit 53 determines that the person 80 is in a "standby state 4", the control device 2 activates a not-illustrated ejection device, to eject the target object 50, and activates a not-illustrated loader device, to place a subsequent target object 50 to be fabricated at a position shown in FIG. 1.

The detail of the operation procedure has been described above. If a process is skipped, the robot 1 is stopped (or is brought into a standby state), and, alarming is performed using, e.g., PATLITE (registered trademark) etc., or the skipped process is displayed on a screen. Note that, when the process ends, the data of the operation information and the learning information are transmitted to a cell controller that will be described later. In this instance, the images photographed by the camera 7 hanging from the ceiling are deemed to be preferable as input images corresponding to the outputs in FIG. 29. This is because the state of units and cables in the target object 50 may be photographed, and accordingly, the position of the person (arm of the person) 80 and the driver 9M may be easily specified.

Note that the accuracy may be further improved by preparing another machine learning device, and making an AND (logical conjunction) by combining, e.g., the outputs of the recognition unit using, as inputs, the images from the camera 8 with the outputs of the recognition unit using, as inputs, the images from the camera 7. In the above descriptions, two cameras are provided, but three or more cameras may be provided. Further, template matching may be used together.

Only cases where the output of the neural network, which corresponds to an effective operation, is effective (success: the operation shifts to a correct operation) have been described above. The response to cases where the corresponding output is not effective (failure: the operation does not shift to a subsequent operation), or cases where an erroneous movement occurs (failure: the operation has to be in a standby mode, but accidentally shifts to a subsequent operation) will be described below. In case of failure, the person changes, e.g., the shape of the hand or the arm of the person into a predetermined shape, to announce the failure, or pushes a foot switch, to output a failure signal to announce the failure. If the operation has been in a standby mode, the operation shifts to a subsequent operation. If the operation has to be in a standby mode, but accidentally shifts to a subsequent operation, the operation returns to the previous original state.

FIG. 30 shows that "failure" is output from the neural network shown in FIG. 29. Note that, when the predetermined shape of the hand or the arm of the person and the foot switch are used together, an OR (logical add) of the "output O" shown in FIG. 30 and the failure signal from the foot switch is made. When only the failure signal in the foot switch is used, the failure signal from the foot switch corresponds to the "output O" in FIG. 30. Further, the failure is conveyed to the learning unit 54. Two methods for informing a failure have been described above. However, of course, various methods other than these two methods may be adopted.

Figure 32:
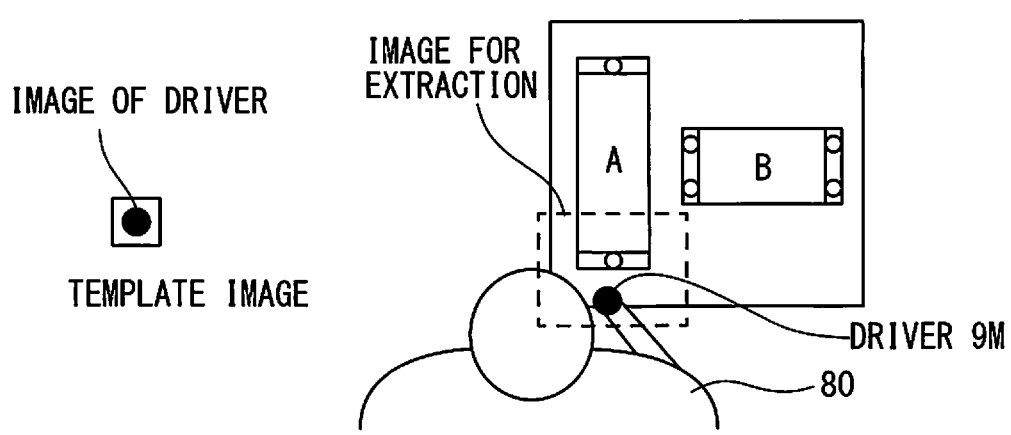
FIG. 32 is a view for explaining the state in which an action B in FIG. 29 is recognized by template matching.

The determination of the action of a person using template matching will be described. The outputs in FIG. 29 (FIG. 30) will be interpreted as actions. FIG. 32 is a view for explaining that the action B in FIG. 29 is recognized by template matching. When, e.g., the robot 1 finishes mounting the units A and B in the target object 50, the subsequent operation is "moving to a position for fastening a screw of the unit A", and accordingly, whether there is an image corresponding to the template, among images to be extracted, within a given area centered at the point, at which the person 80 fastens a screw of the unit A, is examined. If, as shown in FIG. 32, the driver M moving to the position for fastening a screw of the unit A is included in an image (is photographed), a calculation value may be obtained in accordance with the similarity to the image of the template (the value is 0 if the similarity is complete, and the value is small if the similarity is small), and accordingly, the fact that the action B is satisfied may be determined.

Figure 33:
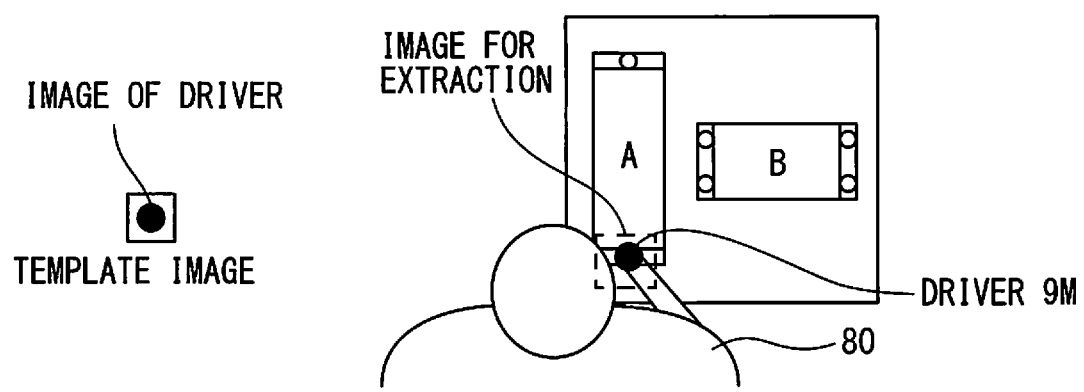
FIG. 33 is a view for explaining the state in which an action C in FIG. 29 is recognized by template matching.

FIG. 33 is a view for explaining that the action C in FIG. 29 is recognized by template matching. The subsequent operation is, e.g., "the screwing operation in the unit A", and accordingly, whether there is an image corresponding to the template, among images to be extracted, within a narrow area around the screw, is examined, to recognize that the person 80 has moved to the position for fastening the screw of the unit A. When the driver M, which is positioned at the position for fastening a screw of the unit A, is included in an image as shown in FIG. 33, the calculation value is 0 or small as described above, and accordingly, it is possible to determine that this point of time corresponds to the start of "the screwing operation for the unit A", or it is possible to determine, after a given period of time, that this point of time corresponds to the start of "the screwing operation for the unit A" because there is a slight gap of time between when the driver reaches the screw and when the driver actually start fastening the screw.

If further clarification of the start of the screwing operation is required, it is possible to determine that the start of the downward movement of the driver 9M of the person 80 in the image of the camera 8 corresponds to the start of the screwing operation. The basic idea has been described, as an example, using the action B and the action C. The same idea may be applied to the other actions.

Figure 34:
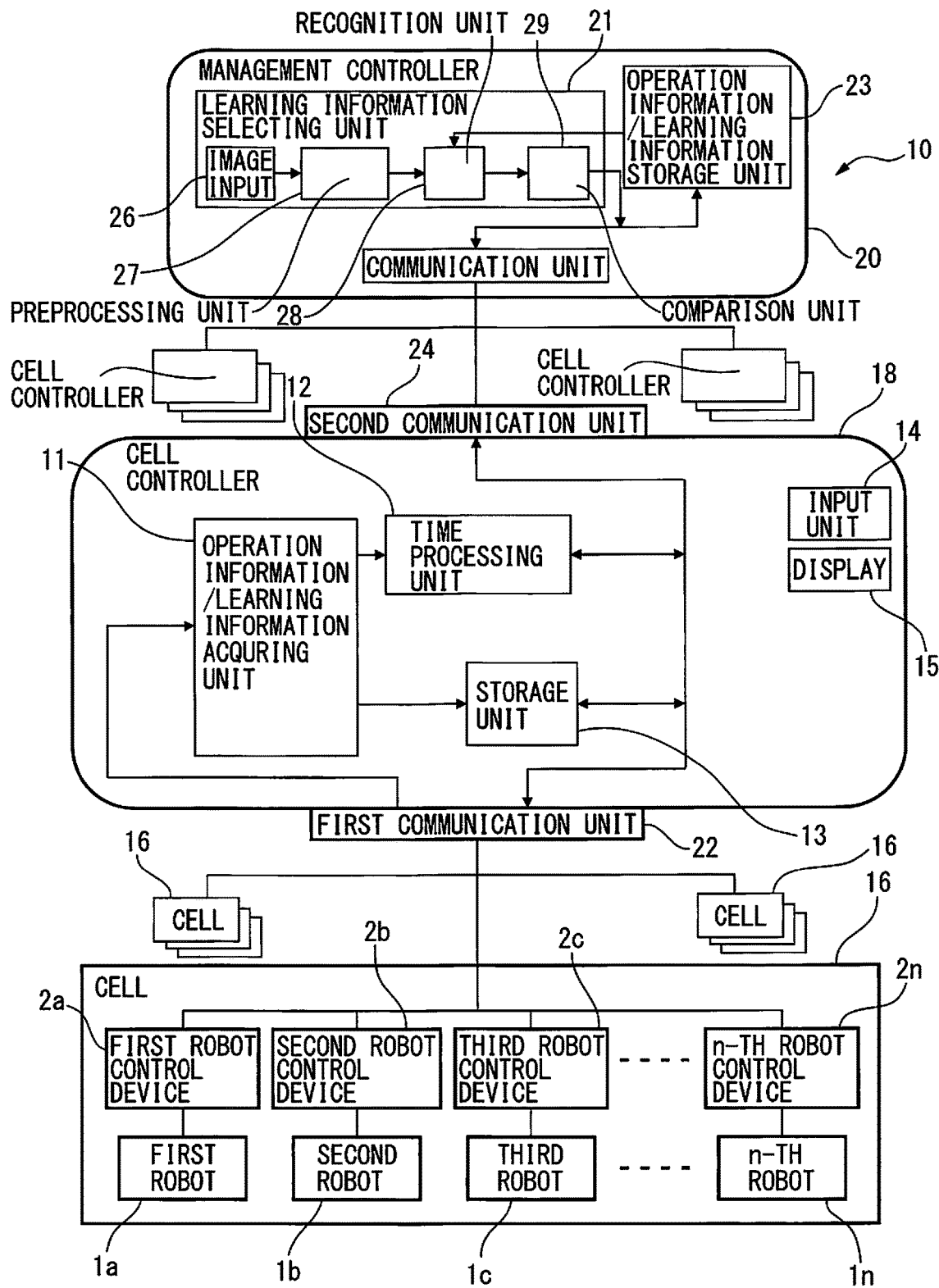
FIG. 34 is a block diagram of an example of a production system according to this embodiment.

A production system including one or more robot systems will now be described. FIG. 34 is a block diagram of an example of a production system according to this embodiment. As shown in FIG. 34, the production system 10 includes: cells 16 each including at least one, preferably, a plurality of robots 1a to 1n (the number of which is n in an example shown in FIG. 34) and one or more control devices 2a to 2n (the number of which is usually the same as that of the robots, i.e., n) for controlling the robots 1a to 1n; cell controllers 18 each configured to be capable of communicating with the control devices 2a to 2n; and a higher-level management controller 20 configured to be capable of communicating with each cell controller 18. The control devices 2a to 2n respectively control the actions of the robots 1a to 1n, and transmit the information on the operation (operation information) and the weights in the neural network learned by the learning unit 54 of the machine learning device 5 to the corresponding cell controller 18 as learning information.

The operation information is composed of, e.g., the name of items (item), the process, the person 80 specified by image recognition etc., the type of the robot 1, and the operation time of the person 80 and the robot 1. The operation time of the person 80 and the robot 1 is composed of the time from the start to the end of assembling, and the motion time and the downtime of the person 80 and the robot 1 at every operation. Note that each cell 16 is a collection of the robots for performing a predetermined operation. The robots 1a to 1n are not limited to articulated robots. The types of the robots may be the same or different. The cells 16 may be installed in a factory for producing products, whereas the management controller 20 may be installed in, e.g., a building different from the factory. The cell controllers 18 are installed in a factory if high-speed treatments are required, and may be installed in, e.g., a building different from the factory if high-speed treatments are not required.

Each cell controller 18 and the control devices 2a to 2n may be connected via a network (first communication unit 22), such as an intranet. The management controller 20 may be communicably connected to each cell controller 18 via a network (second communication unit 24), such as the Internet. However, this is only an example. Any communication units, which may communicably connect each cell controller 18 and the control devices 2a to 2n, may be adopted as the first communication unit 22. Any communication units, which may communicably connect each cell controller 18 and the management controller 20, may be adopted as the second communication unit 24. Each cell controller 18 is configured to process the information from the corresponding cell 16.

Specifically, each cell controller 18 transmits the information to the corresponding control devices 2a to 2n, and receives the operation information and the learning information from the corresponding control devices 2a to 2n.

As shown in FIG. 34, each cell controller 18 receives the above described information from the corresponding cell 16 via the first communication unit 22, and acquires the information stored in the management controller 20 via the second communication unit 24. Each cell controller 18 includes an input unit 14 and a display 15. The display 15 is formed so as to display the information regarding the cell controller 18.

Examples of the display 15 include a liquid crystal display device. The input unit 14 is formed so that the person may input desired commands to the cell controller 18. Examples of the input unit 14 include a keyboard etc. Note that it is preferable that the management controller 20 includes an input unit and a display, which are not illustrated.

An operation information/learning information acquisition unit 11 of each cell controller 18 acquires the operation information and the learning information from the control devices of the corresponding cell 16.

The operation information/learning information acquisition unit 11 associates the operation information with the learning information, stores the associated information in a storage unit, and transmits operation time data in the operation information to a time processing unit. The time processing unit 12 reads out an appropriate time per operation of the person for the same item in the same process from the storage unit 13, among the acquired operation time data, and compares it with a time per operation of the person 80. The comparison is performed by "the time per operation of the person 80−(minus) the appropriate time per operation of the person". If the difference is larger than a predetermined time (If the appropriate time per operation of the person is obviously short), a delayed operation (operation that takes time) is transmitted to the corresponding control device 2 via the first communication unit 22 (see FIG. 2). The information on the delayed operation is input to a display control unit 56 or a not-illustrated voice control unit via a communication unit 55 of the control device 2, to display the detail of the operation, the standard operation time (the operation time deemed to be appropriate), the actual operation time (the time actually necessary for the operation), etc. on a display placed near the person 80, or to announce the detail of the operation or the time via an audio guidance from a speaker installed in, e.g., the robot.

Note that the information on the appropriate time per operation of the person is previously prepared, or the time obtained by, e.g., averaging the transmitted times per operation for the same process in the same item is used. Regarding the action of the robot 1, the action of the robot 1 per operation may be optimized by performing reinforcement learning adopting, among machine learning methods, the aforementioned Q-learning. In recent years, various proposals have been made for the technology for optimizing the action of the robot 1 using machine learning. The details of the proposals are omitted.

The cell controller 18 transmits the operation information and the learning information to the management controller 20 via the second communication unit 24. All of the operation information and the learning information may be transmitted, or only the operation information and the learning information regarding the longest and shortest operation times between given intervals may be transmitted.

Alternatively, the average of the operation times may be additionally transmitted. In addition, the contents of the operation information and the learning information, and how to use the contents may be freely selected.

The management controller 20 is connected to each cell controller 18 via the second communication unit 24.

The management controller 20 receives the operation information and the learning information from the cell controller 18 via the second communication unit 24. The operation information and the learning information, which have been received, are associated with each other, and are stored in an operation information/learning information storage unit 23.

Regarding a method for deciding weights using a learning information selecting unit 21 of the management controller, a first embodiment will be described.

Suppose that items a are produced on a large scale. If an unspecified person for processing the items a performs an operation at, e.g., a process 3 with which the person has no experience, the weight to be applied to the person is zero. A method for deciding a weight in such a case will be described. Suppose that a plurality of persons (e.g., a person A, a person B, a person C) have an experience with an operation of the item α/process 3, and the operation information/learning information storage unit 23 of the management controller 20 stores operation information/learning information.

When the persons A, B, and C perform the operation of the item α/process 3, a required number of corresponding input images per operation when the outputs of the neural network corresponding to the operations are effective, are stored in the operation information/learning information storage unit 23 of the management controller 20. The learning information (weight) for the person A in the item α/process 3 is read out from the operation information/learning information storage unit 23, and is input to a recognition unit 28 of the learning information selecting unit 21. The image of the person B stored in the operation information/learning information storage unit 23 is read out and input to an image input 26, and is processed by preprocessing (preprocessing performed by a preprocessing unit 27), and then, is recognized (classified) by a recognition unit 28, and is input to a comparison unit 29. Likewise, the image of the person C is input to the image input 26, and is preprocessed by the preprocessing unit 27, and then, is recognized by the recognition unit 28, and is input to the comparison unit 29.

The learning information (weight) for the person B in the item α/process 3 is read out from the operation information/learning information storage unit 23, and is input to the recognition unit 28 of the learning information selecting unit 21. The image of the person A stored in the operation information/learning information storage unit 23 is read out and input to the image input 26, and is preprocessed by the preprocessing unit 27, and then, is recognized by the recognition unit 28, and is input to the comparison unit 29. Likewise, the image of the person C is input to the image input 26, and is reprocessed by the preprocessing unit 27, and then, is recognized by the recognition unit 28, and is input to the comparison unit 29.

The learning information (weight) for the person C in the item α/process 3 is read out from the operation information/learning information storage unit 23, and is input to the recognition unit 28 of the learning information selecting unit 21. The image of the person A stored in the operation information/learning information storage unit 23 is read out and input to the image input 26, and is preprocessed by the preprocessing unit 27, and then, is recognized by the recognition unit 28, and is input to the comparison unit 29. Likewise, the image of the person B is input to the image input 26, and is preprocessed by the preprocessing unit 27, and then, is recognized by the recognition unit 28, and is input to the comparison unit 29.

For each weight, the value of the output of the neural network in each operation of each person may be found. Thus, for each weight, whether or not the value of the output of the neural network corresponding to each operation of each person is equal to or larger than a predetermined value, and the difference with another output is equal to or larger than a predetermined value may be found, or the degree of the difference between the value of the output and another output may be found. For, e.g., the weight for the person A, a plurality of output values (for the person B and the person C) of the neural network may be obtained, and accordingly, whether the plurality of output values for the weight for the person A are appropriate is determined by the comparison unit 29. Regarding, e.g., the weight for the person A, when the output of the neural network for the image of the person B in each operation is appropriate, but the output of the neural network for the image of the person C in each operation is often inappropriate, it is difficult to determine that the weight for the person A is appropriate. Likewise, whether the output values for the weights for the person B and the person C are appropriate is determined by the comparison unit 29. For the weights, the most appropriate weight is selected. The selected most appropriate weight for the person is stored, as the weight for the item α/process 3, in the operation information/learning information storage unit along with the information of the item α/process 3. If it is necessary to immediately use the weight, the weight is transmitted to the control devices (the recognition unit and the learning unit of the machine learning device) of the corresponding cell.

Regarding a method for deciding a weight using the learning information selecting unit 21 of the management controller, a second embodiment will be described.

Suppose that items a are produced on a large scale. The case where a specified person (e.g., a person F) for processing the items a performs an operation at, e.g., the process 3 with which the person has no experience, will be described. Suppose that a plurality of persons (e.g., the person A, the person B, the person C) have an experience with an operation of the item α/process 3, and the operation information/learning information storage unit 23 of the management controller 20 stores operation information/learning information.

An input image (if possible, a supervised input image) for each operation of the person F in the item α/process 3 is prepared. The learning information (weight) for the person A in the item α/process 3 is read out from the operation information/learning information storage unit 23, and is input to the recognition unit 28 of the learning information selecting unit 21. The prepared image for each operation of the person F is input to the image input 26, and is preprocessed by the preprocessing unit 27, and then, is recognized (classified) by the recognition unit 28, and is input to the comparison unit 29. The value of the output of the neural network in each operation may be found, and accordingly, the sum of errors is calculated (in the case of supervised learning. Calculation of errors is well known, and accordingly, the detail thereof is omitted). Alternatively, whether or not the value of the output of the recognition unit corresponding to each operation is equal to or larger than a predetermined value, and the difference with another output is equal to or larger than a predetermined value may be examined, or the degree of the difference between the value of the output and another output may be examined. The process for the person A ends, and then, the process for the person B starts, and the process for the person B ends, and then, the process for the person C starts, and the process of the person C ends. The processes for the person B and the person C proceed in a manner similar to that of the person A to find the value of the output of the neural network for each operation, and then, the comparison unit 29 compares results obtained from weights of the person A, the person B, and the person C with one another to select the weight for the person having the smallest sum of errors. The selected weight is stored in the operation information/learning information storage unit 23 along with the information of the item α/process 3/the person F. If it is necessary to immediately use the weight, the weight is transmitted to the control devices (the recognition unit and the learning unit of the machine learning device) of the corresponding cell.

Regarding a method for deciding a weight without using the learning information selecting unit 21, a third embodiment will be described. Suppose that items a are produced on a large scale. The case where a specified person (e.g., the person F) for processing the items a performs an operation at, e.g., the process 3 with which the person has no experience, will be described. Suppose that a plurality of persons (e.g., the person A, the person B, the person C) have an experience with an operation of the item α/process 3, and the operation information/learning information storage unit 23 of the management controller 20 stores operation information/learning information. The weight for the person A is transmitted from the management controller to the recognition unit and the learning unit of the control device of the corresponding cell, and the result of each operation performed by the person F (e.g., the difference between the value of the corresponding output and another output) is examined. Subsequently, the weight for the person B is transmitted, and, likewise, the result of each operation performed by the person F is examined. Subsequently, the weight for the person C is transmitted, and, likewise, the result of each operation performed by the person F is examined. Among these weights, the weight for the most highly recognized person is used as a weight for the person F in the item α/process 3.

The weights for the person A, the person B, and the person C in the item α/process 3 may be combined into one weight, and the combined weight may be used as the weight for the item α/process 3. The combined weight is stored in the operation information/learning information storage unit 23 along with the information of the item α/process 3. Further, the combined weight may be used in the first to third embodiments. Note that weights for a plurality of persons may be combined by distributed learning or transfer learning. In, e.g., the first embodiment, the combined weight is input to the recognition unit 28 of the learning information selecting unit 21. The image of the person A stored in the operation information/learning information storage unit 23 is read out and input to the image input 26, and is preprocessed by the preprocessing unit 27, and then, is recognized by the recognition unit 28, and is input to the comparison unit 29. The same is true for the person B and the person C.

In the comparison unit 29, the most appropriate weight is selected among the combined weight, the weight for the person A, the weight for the person B, the weight for the person C. The selected weight is stored, as the most appropriate weight in the item α/process 3, in the operation information/learning information storage unit 23 along with the information of the item α/process 3. Regarding the method for deciding weights, the operator has been described as an unspecified person in the first embodiment, and described as a specified person in the second and third embodiments. However, if, in the person which already has an experience with an operation (e.g., the person A), the weight for himself/herself (the person A) is transmitted from the controller to the control device 2, "which one is better", e.g., the weight obtained by combining the weights for a plurality of persons in the item α/process 3 or the weight for the person A, may be determined, using the learning information selecting unit 21, to transmit the better one. The learning unit 54 is provided in, e.g., the machine learning device 5 of the control device 2, but may be provided in the cell controller or the management controller. Images are input to the image input 26, but, of course, any images, which have been preprocessed, may be input to the recognition unit 28.

According to the control device, the robot system, and the production system according to the present invention, the action of a robot may be controlled by recognizing and learning the action of a person.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A control device for a robot for performing an operation in cooperation with a person, the control device comprising:
    a machine learning device including a recognition unit which recognizes a face of the person to classify an action of the person based on a weight in a neural network corresponding to the person, and a learning unit for receiving data based on an image input as state variable, and learning and outputting the action of the person based on the action of the person classified by the recognition unit, while the person performs an operation in cooperation with the robot; and
    an action control unit for controlling the action of the robot based on the action of the person classified by the recognition unit and a learned result of the learning unit.

2. The control device according to claim 1, wherein
    the recognition unit receives the state variable and generates an output obtained by classifying the action of the person, and
    the learning unit comprises:
        an error calculation unit that receives the output obtained by classifying the action of the person, which is generated by the recognition unit, and calculates an error based on teacher data which have been input; and
        an error model update unit that updates, based on an output of the error calculation unit, an error model for controlling an action of the robot by the action of the person.

3. The control device according to claim 1, wherein
    the robot is an industrial robot, a field robot, or a service robot.

4. The control device according to claim 1, wherein
    the recognition unit uses at least one of a neural network and template matching.

5. The control device according to claim 1, further comprising a plurality of cameras for photographing, wherein
    the recognition unit recognizes an action of the person based on an image photographed by each camera, and uses an output of the recognition unit as an input of an AND circuit, and an output of the AND circuit as an output of the recognition unit.

6. The control device according to claim 1, wherein
    the control device transmits, after the person acts in cooperation with the robot, operation information and learning information to a higher-level controller.

7. The control device according to claim 6, wherein
    the operation information includes at least one of an item name, a process, a person specified by image recognition, the type of the robot, and the operation time of the person and the robot, and
    the operation time includes at least one of a time from the start to the end of an operation, and a motion time and a downtime of the person and the robot at every operation.

8. The control device according to claim 6, wherein
    the learning information is a weight in the neural network.

9. A robot system comprising a plurality of control devices according to claim 1, wherein
    the plurality of control devices are connected to one another via a communication line, and the control devices each learn an action of a person separately, and transmit the learned information via the communication line, to share the same.

* * * * *